US008755097B2

(12) United States Patent
Fujita et al.

(10) Patent No.: US 8,755,097 B2
(45) Date of Patent: Jun. 17, 2014

(54) IMAGE READING DEVICE AND IMAGE FORMING APPARATUS

(75) Inventors: Atushi Fujita, Miyagi (JP); Hideki Tobinaga, Kanagawa (JP); Takashi Fukumoto, Miyagi (JP); Michitaka Suzuki, Kanagawa (JP); Mamoru Kambayashi, Tokyo (JP); Masataka Fukuchi, Miyagi (JP); Kazuki Morita, Miyagi (JP)

(73) Assignee: Ricoh Company, Limited, Tokyo (JP)

( * ) Notice: Subject to any disclaimer, the term of this patent is extended or adjusted under 35 U.S.C. 154(b) by 114 days.

(21) Appl. No.: 13/420,932

(22) Filed: Mar. 15, 2012

(65) Prior Publication Data
US 2012/0236375 A1 Sep. 20, 2012

(30) Foreign Application Priority Data

Mar. 18, 2011 (JP) ................................ 2011-061505

(51) Int. Cl.
*H04N 1/04* (2006.01)
(52) U.S. Cl.
USPC ........................... 358/498; 358/474; 358/486
(58) Field of Classification Search
USPC .......... 358/474, 498, 497, 496, 486; 399/374, 399/367; 271/212, 65, 92
See application file for complete search history.

(56) References Cited

U.S. PATENT DOCUMENTS

| 5,446,511 A * | 8/1995 | Kitahara et al. | 353/103 |
| 5,986,775 A | 11/1999 | Yoshimizu | |
| 8,072,653 B2 * | 12/2011 | Iwata et al. | 358/474 |
| 8,295,757 B2 * | 10/2012 | Matsushima | 399/374 |
| 8,400,690 B2 * | 3/2013 | Tojo | 358/498 |
| 8,427,718 B2 * | 4/2013 | Omoya | 358/475 |
| 8,488,217 B2 * | 7/2013 | Takahashi et al. | 358/475 |
| 8,493,639 B2 * | 7/2013 | Samoto et al. | 358/498 |
| 8,537,434 B2 * | 9/2013 | Takahashi et al. | 358/475 |
| 8,570,623 B2 * | 10/2013 | Fujii et al. | 358/498 |
| 8,582,184 B2 * | 11/2013 | Oshima | 358/474 |
| 8,599,450 B2 * | 12/2013 | Kubo et al. | 358/498 |
| 2005/0254103 A1 | 11/2005 | Sugiyama et al. | |
| 2010/0142007 A1 | 6/2010 | Seto | |

FOREIGN PATENT DOCUMENTS

| EP | 1 220 527 | 7/2002 |
| EP | 1 601 180 | 11/2005 |
| JP | 4477043 B2 | 9/2007 |

OTHER PUBLICATIONS

Abstract of JP 2007-238335 published Sep. 20, 2007.
European Search Report dated Mar. 5, 2013.

* cited by examiner

*Primary Examiner* — Negussie Worku
(74) *Attorney, Agent, or Firm* — Harness, Dickey & Pierce, P.L.C.

(57) ABSTRACT

An image reading device includes an upstream-side conveying unit configured to convey an original; a reading unit configured to read an image of the original conveyed by the upstream-side conveying unit; and a guide unit arranged between the upstream-side conveying unit and the reading unit to guide the original. As seen from a direction parallel to a reading surface of the reading unit and perpendicular to an original conveying direction in a reading position of the reading unit, an original conveying position for applying a conveying force to the original using the upstream-side conveying unit is arranged in a lower side from the reading position in a direction perpendicular to the reading surface of the reading unit, and the guide unit is configured such that the original passing through the original conveying position is guided to an upper direction.

14 Claims, 12 Drawing Sheets

IMAGE READING DEVICE AND IMAGE FORMING APPARATUS

CROSS-REFERENCE TO RELATED APPLICATIONS

The present application claims priority to and incorporates by reference the entire contents of Japanese Patent Application No. 2011-061505 filed in Japan on Mar. 18, 2011.

BACKGROUND OF THE INVENTION

1. Field of the Invention

The present invention relates to an image reading device and an image forming apparatus.

2. Description of the Related Art

In the related art, there is known a sheet-through type image reading device in which the sub-reading of the original image is performed by conveying the original to the reading position of the image reading unit in a sub-reading direction. If a foreign object such as dirt is attached to the reading surface of the image reading unit, this dirt generates a vertical stripe, which may significantly degrade the image.

In Japanese Patent No. 4477043, there is disclosed an image reading device configured to remove dirt attached to the reading surface by conveying the original such that the original makes contact with the reading surface of the image reading unit (image sensor). In the image reading device of Japanese Patent No. 4477043, the conveyed original makes contact with the reading surface of the image reading unit by configuring a pair of guide members including a guide member (hereinafter, referred to as an upper guide member) located in the image reading unit side with respect to the original conveying path provided in the upstream side of the original conveying direction from the image reading unit and a lower guide member arranged to face the upper guide member by interposing the original conveying path as follows. Specifically, a portion of the upper guide member in the downstream side of the original conveying direction is bent to the lower guide member side. In addition, a portion of the lower guide member in the downstream side of the original conveying direction from the bent portion of the upper guide member is bent to the image reading unit side. In such a configuration, the conveyed original is forcibly bent to the lower guide member side as the upper guide member bumps into the bent portion. Then, the original is forcibly bent to the image reading unit side as the lower guide member bumps into the bent portion, so that the original is conveyed to the upper direction, and the original can make contact with the reading surface of the image reading unit. As a result, the dirt attached to the reading surface of the image reading unit can be removed.

In the image reading device disclosed in Japanese Patent No. 4477043, since the original is conveyed while it is forcibly bent by making the original bump into each of the bent portions of the upper guide member and the lower guide member, a conveying force necessary to convey the original to the original reading unit increases. As a result, a size of the motor for conveying the original increases, and a size of the apparatus increases accordingly. In addition, as the size of the motor increases, it is necessary to increase rigidity of a portion for supporting the motor, which also increases costs. In addition, since each guide member conveys the original by forcibly bending the original using the bent portion, the position corresponding to the original, reading unit may be deviated depending on the thickness (stiffness) of the original, and the original may not make contact with the reading surface. Moreover, the dirt attached to the reading surface may not be appropriately removed depending on the thickness of the original.

Therefore, there is a need for an image reading device and an image forming apparatus capable of suppressing an original conveying force from increasing and suppressing a deviation of the position corresponding to the original reading unit depending on thickness (stiffness) of the original.

SUMMARY OF THE INVENTION

It is an object of the present invention to at least partially solve the problems in the conventional technology.

According to an embodiment, there is provided an image reading device that includes an upstream-side conveying unit configured to convey an original; a reading unit configured to read an image of the original conveyed by the upstream-side conveying unit; and a guide unit arranged between the upstream-side conveying unit and the reading unit to guide the original. As seen from a direction parallel to a reading surface of the reading unit and perpendicular to an original conveying direction in a reading position of the reading unit, an original conveying position for applying a conveying force to the original using the upstream-side conveying unit is arranged in a lower side from the reading position in a direction perpendicular to the reading surface of the reading unit, and the guide unit is configured such that the original passing through the original conveying position is guided to an upper direction.

According no another embodiment, there is provided an image forming apparatus that includes the image reading device according to the above embodiment; and an image forming unit configured to form an image based on a result of the reading of the image reading device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an electrophotography copying machine (hereinafter, simply referred to as a copying machine 500) according to an embodiment of the invention will be described with reference to the accompanying drawings.

First, a basic configuration of the copying machine 500 according to the present embodiment will be described.

Figure 1:
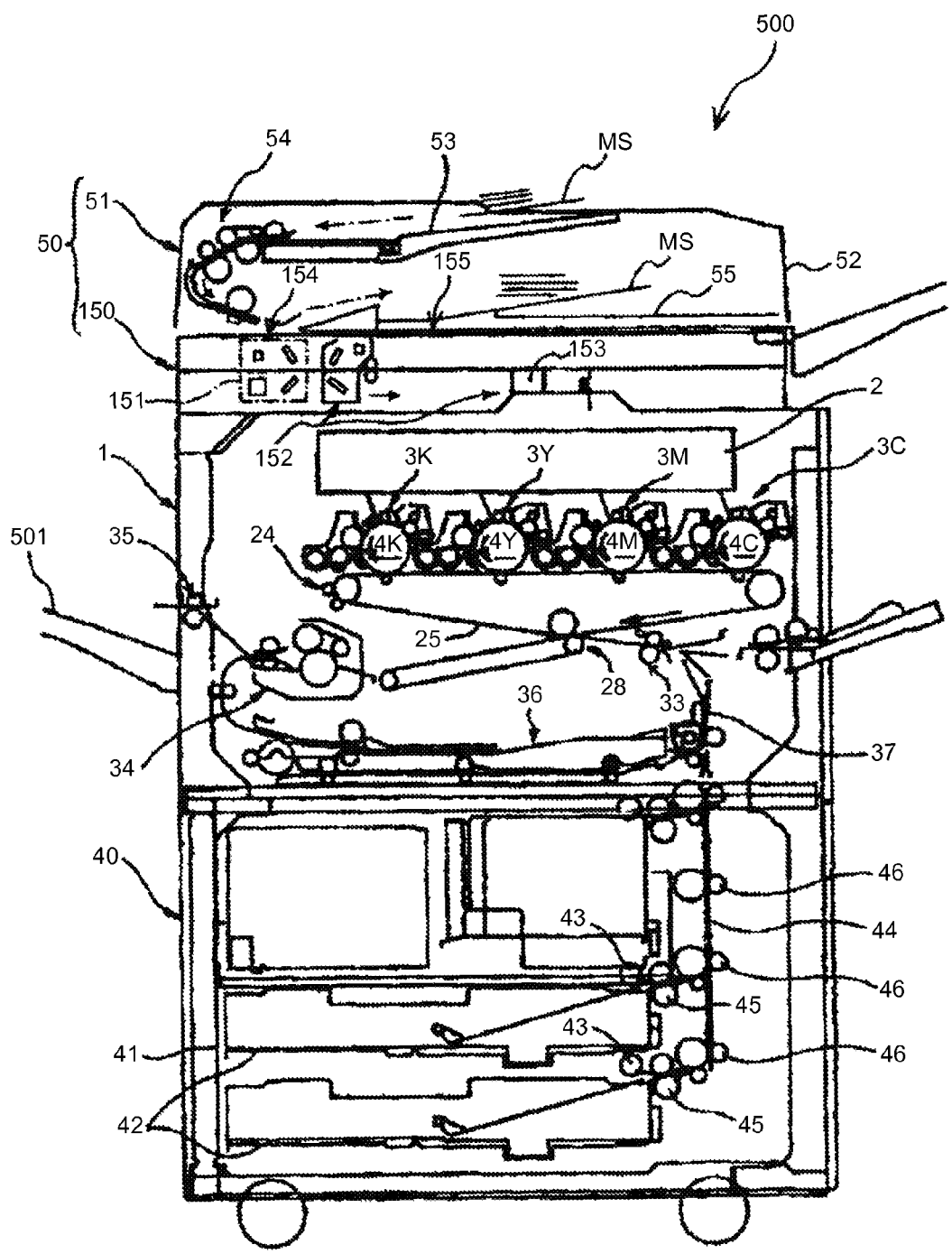
FIG. 1 is a schematic configuration diagram illustrating a copying machine according to an embodiment of the invention.

FIG. 1 is a schematic configuration diagram illustrating a copying machine 500. The copying machine 500 includes an image forming unit 1 as an image forming unit, a sheet feeding unit 40, and an image reading unit 50. The image reading unit 50 as an image reading device includes a scanner 150 fixed on the image forming unit 1 and an automatic document feeder (hereafter, referred to as an ADF) as a sheet conveying device supported by the scanner 150.

The sheet feeding unit 40 includes two sheet feeding cassettes 42 provided in a paper bank 41 in multiple stages, a sheet discharge roller 43 configured to discharge the sheet P from the sheet feeding cassette 42, a sheet separation roller 45 configured to separate the discharged sheet P and supplying the sheet to a sheet feeding path 44, and the like. In addition, the sheet feeding unit 40 also includes a plurality of carriage rollers 46 and the like for conveying the sheet P as a sheet-shaped member so a sheet feeding path 37 in the main body side as a conveying path of the image forming unit 1. In addition, the sheet P in the sheet feeding cassette 42 is fed to the sheet feeding path 37 in the main body side of the image forming unit 1.

The image forming unit 1 includes an optical writer 2, four process units 3K, 3Y, 3M, and 3C configured to form black, yellow, magenta, and cyan toner images (K, Y, M, and C), a transfer unit 24, a sheet conveying unit 28, a registration roller pair 33, a fixing unit 34, a switch-back unit 36, the sheet feeding path 37 of the main body side, and the like. In addition, the image forming unit 1 irradiates laser light L toward four drum-shaped photosensitive elements 4K, 4Y, 4M, and 4C by driving a light source such as a laser diode or an LED (not illustrated) provided in the optical writer 2. This irradiation forms an electrostatic latent image on the surface of the photosensitive elements 4K, 4Y, 4M, and 4C, and the latent images are developed into toner images through a predetermined developing process.

Figure 2:
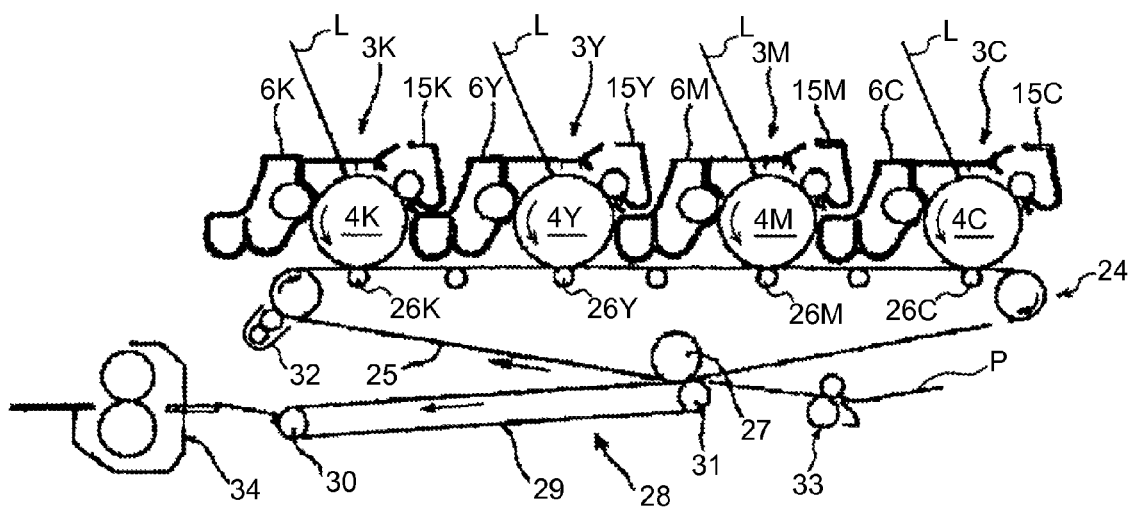
FIG. 2 is a partial configuration diagram partially enlargedly illustrating an image forming unit in the copying machine.
Figure 3:
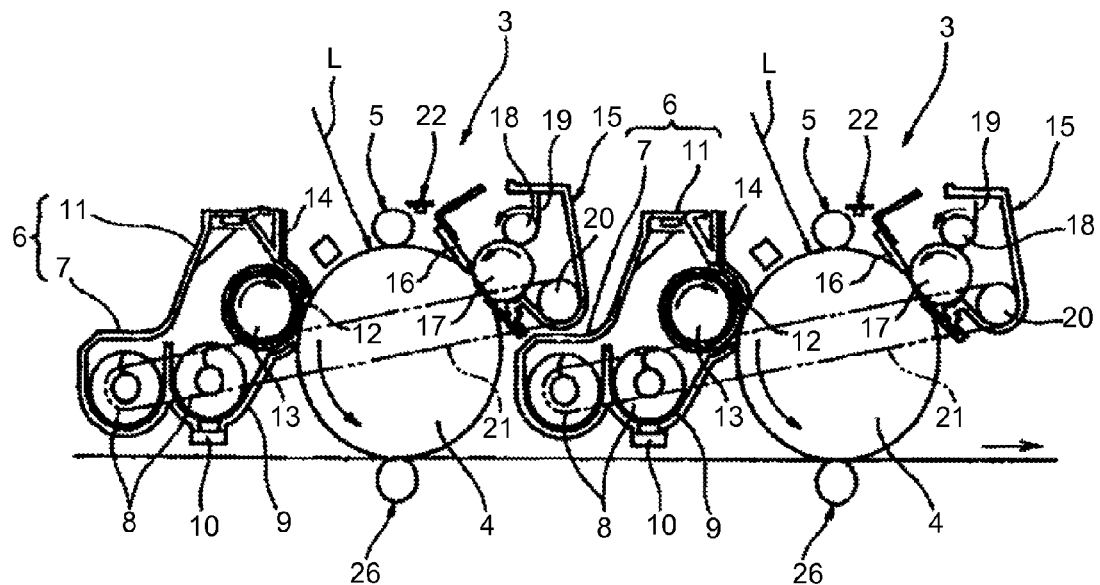
FIG. 3 is a partially enlarged view illustrating a part of a tandem unit including four process units in the image forming unit.

FIG. 2 is a partial configuration diagram partially enlargedly illustrating an internal configuration of the image forming unit 1. FIG. 3 is a partially enlarged view illustrating a part of a tandem unit including four process units 3K, 3Y, 3M, and 3C. The four process units 3K, 3Y, 3M, and 3C have the same structure while toners contained therein are different. Therefore, in FIG. 3, the subscripts K, Y, M, and C are omitted intentionally.

In each of the process units 3K, 3Y, 3M, and 3C, a photosensitive element 4 and various surrounding devices are supported by a common support as a single unit so as to be detachable to the image forming unit 1 of the main body of the copying machine 500. A single process unit 3 includes a charging unit 5, a developing unit 6, a drum cleaning device 15, and a neutralization lamp 22 around the photosensitive element 4. It is assumed that the copying machine 500 has a so-called tandem type structure in which the four process units 3K, 3Y, 3M, and 3C are arranged side by side along a movement direction toward an intermediate transfer belt 25 described below.

The photosensitive element 4 has a drum shape in which a photosensitive layer is formed by coating an organic photosensitive material having a photosensitive property on an elementary pipe such as aluminum. Alternatively, the photosensitive element 4 may have an endless belt shape.

The developing unit 6 develops a latent image using two-element developer containing magnetic carrier particles and non-magnetic toner (not illustrated). The developing unit 6 includes an agitator 7 for agitating the two-element developer contained inside and conveying and supplying it to a developing sleeve 12 and a developing unit 11 for transferring the toner of the two-element developer borne on the developing sleeve 12 into the photosensitive element 4.

The agitator 7 is provided in the position lower than the developing unit 11 and includes two conveying screws 8 provided in parallel with each other, a partitioning plate provided between the two conveying screws 8, a toner concentration sensor 10 provided in the bottom of a developing casing 9, and the like.

The developing unit 11 includes the developing sleeve 12 facing the photosensitive element 4 through the opening of the developing casing 9, a magnet roller 13 provided not to rotate inside the developing sleeve 12, a doctor blade 14 for guiding a leading edge to the developing sleeve 12, and the like. The developing sleeve 12 is a non-magnetic rotatable cylinder. The magnet roller 13 has a plurality of magnetic poles sequentially arranged side by side to a rotation direction of the developing sleeve 12 from the position facing the doctor blade 14. These magnetic poles apply a magnetic force to the two-component developer on the developing sleeve 12 at a predetermined position in the rotation direction. As a result, the two-element developer sent from the agitator 7 is guided and borne to the surface of the developing sleeve 12, and a magnetic brush is formed on the surface of the developing sleeve 12 depending on the magnetic flux line.

As the developing sleeve 12 is rotated, the thickness of magnetic brush is appropriately controlled when it passes through the position facing the doctor blade 14, and the magnetic brush is conveyed to a developing area facing the photosensitive element 4. In addition, the toners are transferred to the electrostatic latent image using an electric potential difference between the developing bias applied to the developing sleeve 12 and the electrostatic latent image of the photosensitive element 4 to contribute to development. Further, the magnetic brush is formed and borne to the developing sleeve 12, and the two-element developer passing through the developing area is returned to the developing unit 11 as the developing sleeve 12 is rotated, so that it is escaped from the sleeve surface and returned to the agitator 7 by virtue of an effect of the repulsive magnetic field formed between the magnetic poles of the magnet roller 13. In the agitator 7, an appropriate amount of toner is supplied to the two-element developer based on the detection result of the toner concentration sensor 10. Although the two-element developer is used in the developing unit 6 in this example, a single-element developer that does not contain the magnetic carrier may be employed.

Although a cleaning blade 16 made of an elastic body presses the photosensitive element 4 in the drum cleaning device 15, other types of cleaning devices may be employed. In this example, in order to improve a cleaning capability, a contact conductive type fur brush 17 in which the outer peripheral surface makes contact with the photosensitive element 4 is provided rotatably in the arrow direction of the drawing. This fur brush 17 rakes out a lubricant powder from a solid lubricant (not, illustrated) and coats the lubricant powder on the surface of the photosensitive element 4. A metallic electric field roller 18 for applying a bias to the fur brush 17 is provided rotatably in the arrow direction of the drawing, and the leading edge of a scraper 19 presses thereto. The toner attached to the fur brush 17 is dislocated to the electric field roller 18 which makes contact with the fur brush 17 and is rotated in the counter direction to apply a bias. In addition, the toner is scraped from the electric field roller 18 by the scraper 19 and falls down to a recovery screw 20. The recovery screw 20 conveys the recovered toner to the end of the drum cleaning device 15 in a direction perpendicular to the plane of FIG. 3 and delivers it to an external recycle conveying device 21. The recycle conveying device 21 conveys the delivered recovered toner to the developing unit 6 for recycling.

The neutralization lamp 22 neutralizes the surface of the photosensitive element 4 by light irradiation. The neutralized surface of the photosensitive element 4 is equally charged by the charging unit 5, and then, optical writing is performed by the optical writer 2. Although the charging unit 5 causes the charging roller, where a charging bias is applied, to rotate while it abuts on the photosensitive element 4 in the copying machine 500, a scorotron charger in which the charging process is performed for the photosensitive element 4 with no contact and the like may be employed.

In FIG. 2 described above, the black, yellow, magenta, and cyan (K, Y, K, and C) toner images are formed on the photosensitive elements 4K, 4Y, 4M, and 4C of the four process units 3K, 3Y, 3M, and 3C through the process described above.

The transfer unit 24 is arranged under the four process units 3K, 3Y, 3M, and 3C. The transfer unit 24 causes the intermediate transfer belt 25 stretched between a plurality of rollers to move clockwise in the drawing while it abuts on the photosensitive elements 4K, 4Y, 4M, and 4C. As a result, primary transfer nips for black, yellow, magenta, and cyan. K, Y, M, and C are formed as the photosensitive elements 4K, 4Y, 4M, and 4C abut on the intermediate transfer belt 25. In the vicinity of the primary transfer nips for black, yellow, magenta, and cyan K, Y, K, and C, the intermediate transfer belt 25 is pressed to the photosensitive elements 4K, 4Y, 4M, and 4C by primary transfer rollers 26K, 26Y, 26K, and 26C arranged inside the belt loop. A primary transfer bias is applied to the primary transfer rollers 26K, 26Y, 26M, and 26C from a power supply (not illustrated). As a result, a primary transfer electric field for electrostatically moving the toner image on the photosensitive elements 4K, 4Y, 4M, and 4C toward the intermediate transfer belt 25 is formed in the primary transfer nips for black, yellow, magenta, and cyan K, Y, M, and C. As the intermediate transfer belt 25 performs the movement clockwise in the drawing, the toner images are sequentially and overlappingly transferred as a primary transfer operation onto the external surface of the intermediate transfer belt 25 sequentially passing through the primary transfer nips for black, yellow, magenta, and cyan K, Y, M, and C in each primary transfer nip. By overlappingly performing the primary transfer operation, a four-color overlapping toner image (hereinafter, referred to as a four-color toner image) is formed on the external surface of the intermediate transfer belt 25.

Under the transfer unit 24 in the drawing, the sheet conveying unit 28 is provided for movement across an endless sheet conveying belt 29 between a driving roller 30 and a secondary transfer roller 31. In addition, the intermediate transfer belt 25 and the sheet conveying belt 29 are provided between the secondary transfer roller 31 and a lower tension roller 27 of the transfer unit 24. As a result, a secondary transfer nip is formed between the external surface of the intermediate transfer belt 25 and the external surface of the sheet conveying belt 29. A secondary transfer bias is applied to the secondary transfer roller 31 from a power supply (not illustrated). Meanwhile, the lower tension roller 27 of the transfer unit 24 is grounded. As a result, a secondary transfer electric field is formed in the secondary transfer nip.

In the right side of the secondary transfer nip in the drawing, the registration roller pair 33 is arranged. In addition, in the inlet of the registration nip of the registration roller pair 33, a registration roller sensor (not illustrated) is arranged. The leading edge of the sheet P conveyed from the sheet feeding unit 40 to the registration roller pair 33 is detected by the registration roller sensor (not illustrated), the conveyance of the sheet P is halted after a predetermined time, and then, the leading edge bumps into the registration nip of the registration roller pair 33. As a result, a posture of the sheet P is corrected, and alignment is achieved to prepare synchronization with the image formation.

As the leading edge of the sheet P bumps into the registration nip, the registration roller pair 33 resumes the roller rotation at the timing when the sheet. P is synchronized with the four-color toner image on the intermediate transfer belt 25 so that the sheet P is discharged to the secondary transfer nip. In the secondary transfer nip, the four-color toner image on the intermediate transfer belt 25 is collectively transferred to the sheet P as a secondary transfer operation by the influence of a nip pressure or a secondary transfer electric field so that the transferred image is combined with the white color of the sheet P to provide a full-color image. The sheet P passing through the secondary transfer nip is separated from the intermediate transfer belt 25, is held in the external surface of the sheet conveying belt 29, and is conveyed to the fixing unit 34 as the movement of the sheet conveying belt 29 is made.

The residual toner that has not been transferred to the sheet P in the secondary transfer nip during the transfer operation is attached to the external surface of the intermediate transfer belt 25 passing through the secondary transfer nip. The residual toner is scraped and removed by a belt cleaning device 32 in which a cleaning member abuts on the intermediate transfer belt 25.

On the sheet P conveyed to the fixing unit 34, a full-color image is fixed by applying heat or pressure in the fixing unit 34. Then, the sheet P is sent to a pair of ejecting rollers 35 from the fixing unit 34 and discharged to an external discharge tray 501.

In FIG. 1 described above, the switch-back unit 36 as a sheet reversing device is arranged under the sheet conveying unit 28 and the fixing unit 34. As a result, when a duplex printing is performed, a conveying path of the sheet P subjected to the image fixation for a single face is switched to the switch-back unit 36 side using the switching claw, and the sheet P reversely enters into the secondary transfer nip again there. In addition, a secondary image transfer process and a fixing process are performed for the other face of the sheet P, and then, the sheet P is discharged to the discharge tray 501.

An image reading unit 50 including a scanner 150 fixed to the image forming unit 1 or an ADF 51 fixed thereto has two fixed reading units or a movable reading unit 152 as described below. The movable reading unit 152 is arranged beneath a second contact glass 155 fixed to the upper wall of the casing of the scanner 150 to make contact with the original MS so that an optical system including a light source, a reflective mirror, and the like can move left or right in the drawing. In addition, while the optical system is moved from the left to the right, in the drawing, the light emitted from the light source is reflected by the lower surface of the original MS placed on the second contact glass 155, passes through a plurality of reflective mirrors, and then, is received by an image reading sensor 153 fixed to the scanner 150.

Meanwhile, the image reading unit 50 includes, as fixed reading units, a first fixed reading unit 151 arranged in the scanner 150 and a second fixed reading unit 95 arranged in the ADF 51 as described below. The first fixed reading unit 151 having a light source, a reflective mirror, an image reading sensor such as a CCD, and the like is arranged beneath a first contact glass 154 fixed to the upper wall of the casing of the scanner 150 to make contact with the original MS. In addition, when the original MS conveyed by the ADF 51 passes through the first contact glass 154, the light emitted from the light source is sequentially reflected by the first surface of the original MS, passes through a plurality of reflective mirrors, and is received by an image reading sensor 153. As a result, the first surface of the original MS is scanned without moving the optical system including the light source, the reflective mirror, and the like. In addition, the second fixed reading unit 95 scans the second surface of the original MS which has passed through the first fixed reading unit 151.

A main body of the ADF 51 arranged on the scanner 150 includes an original cassette 53 for placing the originals MS before the reading, an original conveying unit 54 for conveying the original MS as a sheet material, and an original stack tray 55 for stacking the original MS after the reading, in a main body cover 52.

Figure 4:
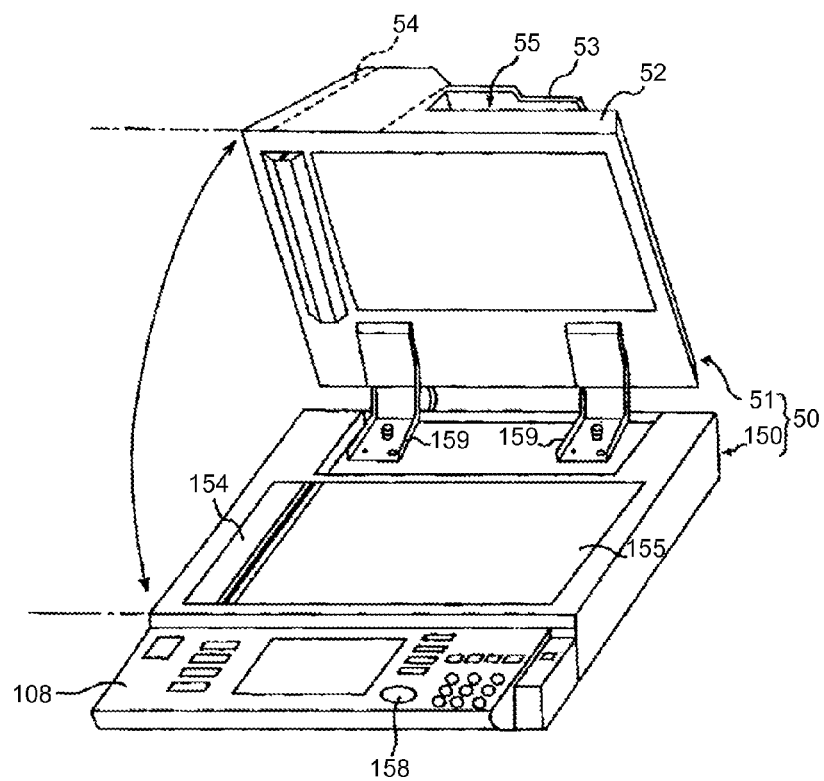
FIG. 4 is a perspective view illustrating a scanner and an ADF in the copying machine.

FIG. 4 is a perspective view illustrating the image reading unit 50. Referring to FIG. 4, the image reading unit 50 is horizontally and pivotably supported by a hinge 159 fixed to the scanner 150. In addition, the image reading unit 50 is behaved like a hinged door by the pivoting. The first contact, glass 154 or the second contact glass 155 of the upper surface of the scanner 150 is exposed in the opened state. In the case of side-bound originals such as a book in which a bundle of originals are bound in a single side, it is difficult to separate the originals one by one. Therefore, it is difficult to use the ADF 51. In this regard, in the case of the side-bound originals, the ADF 51 is opened as illustrated in FIG. 4, the side-bound originals are placed on the second contact glass 155 while a page to be read faces the bottom, the ADF 51 is closed, and then, the image on the page is read by the movable reading unit 152 of the scanner 150 of FIG. 1.

Meanwhile, in the case of a bundle of simply stacked originals without binding, the originals MS are sequentially read by the first fixed reading unit 151 of the scanner 150 or the second fixed reading unit 95 of the ADF 51 while they are automatically conveyed one by one using the ADF 51. In this case, a bundle of originals are set on the original cassette 53, and then, a copy start button 158 on an operation unit 108 is pressed. As a result, the ADF 51 sequentially transmits, the originals MS placed on the original cassette 53 to the original conveying unit 54 from the top, reverses the originals MS, and conveys them to the original stack tray 55. In such a conveying procedure, immediately after the original MS is reversed, it is delivered right above the first fixed reading unit 151 of the scanner 150. In this case, an image of the first surface of the original MS is read by the first fixed reading unit 151 of the scanner 150.

Next, the ADF 51 will be described.

Figure 5:
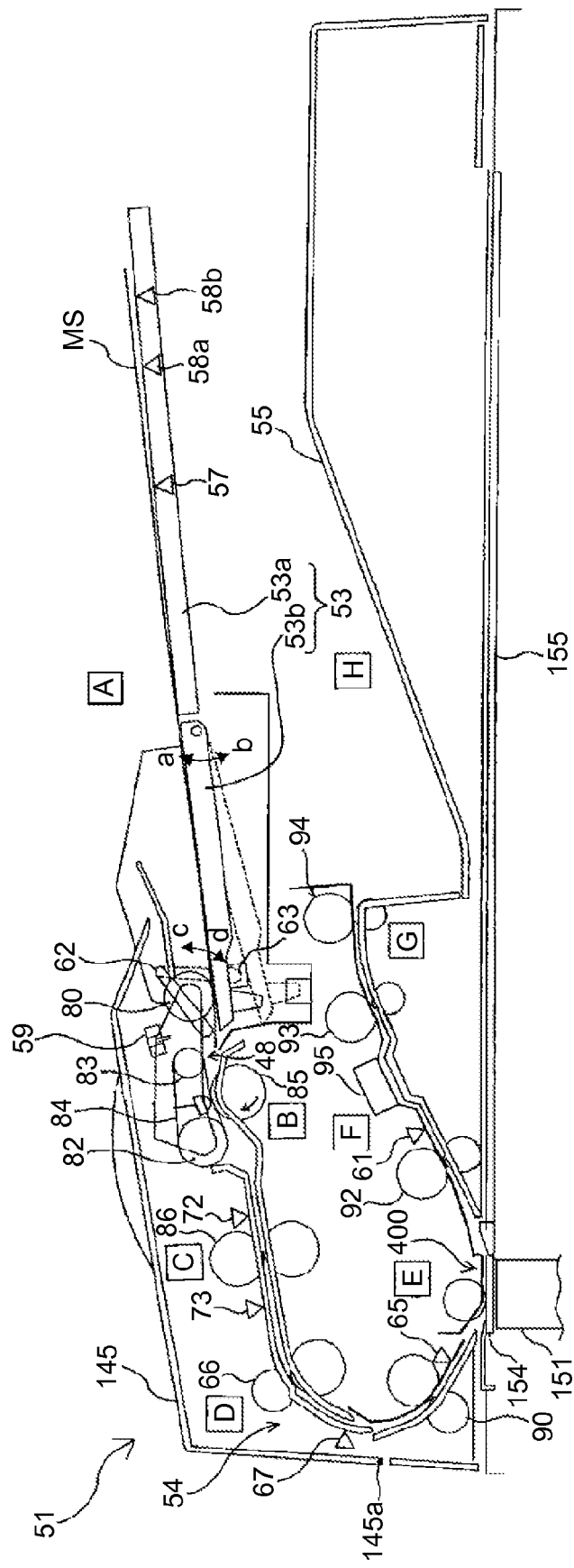
FIG. 5 is a schematic configuration diagram illustrating the ADF along with an upper portion of the scanner.

FIG. 5 is an enlarged configuration diagram illustrating the main components of the ADF 51 along with an upper portion of the scanner 150. The ADF 51 includes an original setting unit A, a separation/conveying unit B, a registration unit C, a turn-over unit B, a first reading/conveying unit E, a second reading/conveying unit F, a discharge unit G, a stack tray H, and the like. The original conveying unit 54 of the ADF 51 according to the present embodiment includes a path for conveying the original MS from a detection position, where an abutting sensor 72 detects the original MS bumping into the downstream side of the separation/conveying unit B, to a reading entrance roller pair 90.

In addition, the ADF 51 includes a feeder cover 145 for opening or closing the feeding path including the separation/conveying unit B, the registration unit C, and the turn-over unit D by pivoting with respect to a cover pivot center 145a relative to the apparatus body.

The original setting unit A has the original cassette 53 and the like, where a bundle of originals MS are set such that the first surface faces upward. The separation/conveying unit B separates and feeds a bundle of the set originals MS one by one. The fed original MS is aligned by temporarily bumping into the registration unit C, and the aligned original MS is extracted and fed. The turn-over unit D has a C-curved feeding unit, where the original MS is folded and reversed so as to make the first surface of the original MS face downward. In the first, reading/conveying unit E, the first surface of the original MS is read by the first fixed reading unit 151 arranged inside the scanner 150 under the first contact glass 154 while the original MS is conveyed on the first contact glass 154. In the second reading/conveying unit F, the second surface of the original MS is read by the second fixed reading unit 95 while the original MS is conveyed to the downstream of the second fixed reading unit 95. In addition, the discharge unit C discharges the original MS, on which the images of both surfaces have been read, to the stack tray H. The stack tray H stores the originals MS in the original stack tray 55 after completing the reading.

Figure 6:
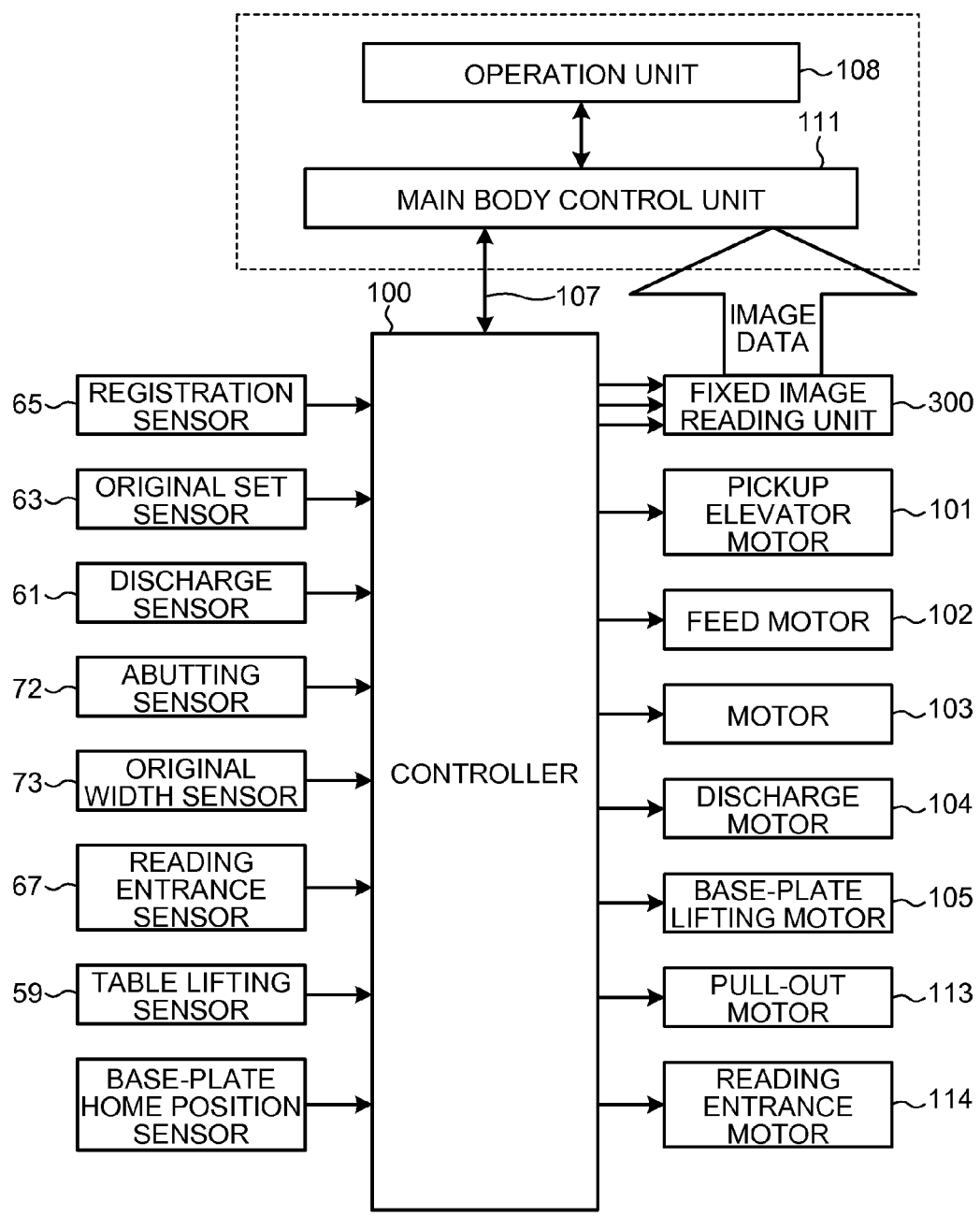
FIG. 6 is a control block diagram illustrating the entire ADF.

FIG. 6 is a control block diagram of the entire ADF 51. The control unit of the ADF 51 includes motors 101 to 105, 113, and 114 as a driving unit for driving the conveying operation of the original, various sensors, a fixed image reading unit 300 (including the first fixed reading unit 151 or the second fixed reading unit 95), a controller 100 for controlling a series of operations, and the like.

Figure 7:
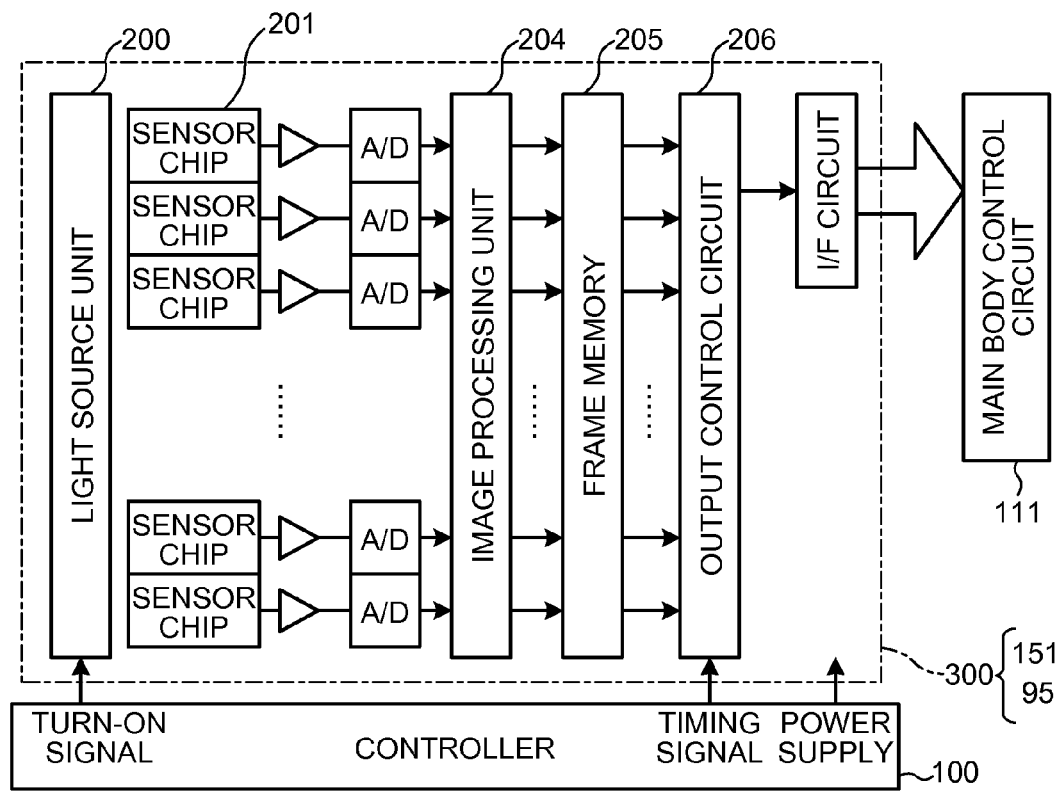
FIG. 7 is a block diagram illustrating a control unit of the fixed reading unit.

FIG. 7 is a block diagram illustrating a control unit of the fixed image reading unit 300. The fixed image reading unit 300 includes a light source unit 200, a sensor chip 201, an image processing unit 204, a frame memory 205, an output control circuit 206, and the like.

A bundle of originals MS to be read are set on the original cassette 53 such that the first surface faces upward. The original cassette 53 includes a movable original table 53b which supports the leading edge of the original and is pivotable in the arrow directions a and b in FIG. 5 depending on the thickness of a bundle of originals MS and a fixed original table 53a which supports the trailing edge of the original. When the original MS is set on the original cassette 53, the original MS is made to bump into side guides (not illustrated) in both ends of the original cassette 53 in the width direction (a direction perpendicular to the conveying direction of the original MS, that is, a direction perpendicular to the plane of FIG. 1) so that the position of the original MS in the width direction is determined.

As a result, the original MS set on the original cassette 53 pushes up a set feeler 62 which is a lever member arranged pivotable to the upper side of the movable original table 53b. Accordingly, an original set sensor 63 detects a set of originals MS and transmits a detection signal to the controller 100. This detection signal is transmitted from the controller 100 to a main body control unit 111 of the image reading unit 50 through an interface circuit (hereinafter, referred to as an I/F 107).

A plurality of original length sensors 57, 58a, and 58b including a reflective photosensor which detects a length of the original MS in the conveying direction or an actuator type sensor which can detect even a single original are arranged in the fixed original table 53a. Using such an original length sensor, the length of the original MS in the conveying direction is approximately determined (it is necessary to provide a sensor that can detect at least whether the original of the same size is laid lengthwise or widthwise).

A pickup roller 80 is arranged over the movable original table 53b. The pickup roller 80 is rotatably driven by a driving force transmitted from a feed motor 102 along with a feeding belt 84 and a reverse roller 85 included in a separation nip as a separator unit.

The movable original table 53b is pivoted in the directions a and b in FIG. 5 using a cam mechanism by driving the base-plate lifting motor 105. As the set feeler 62 or the original set sensor 63 detects that the original MS is set on the original cassette 53, the controller 100 performs control such that the base-plate lifting motor 105 is rotated forward to lift the movable original table 53b so that the uppermost surface of a bundle of originals MS makes contact with the pickup roller 80.

The pickup roller 80 can move in the arrow directions c and d in FIG. 5 using a cam mechanism driven by the pickup elevator motor 101. The movable original table 53b is lifted and pressed by the top surface of the original MS on the movable original table 53b so as to rise in the arrow direction c in the drawing. This is detected by a table lifting sensor 59, and the lifting of the movable original table 53b to the upper limit is detected. As a result, the pickup elevator motor 101 and the base-plate lifting motor 105 stop.

As the copy start button 158 is pressed using the operation unit 108, the original feeding signal is transmitted from the main body control unit 111 to the controller 100 as a control unit of the ADF 51 through the I/F 107. As a result, the feed motor 102 is driven, and the pickup roller 80 is rotated forward so as to pick up several originals MS (ideally, a single sheet) on the original cassette 53. The rotation direction of the pickup roller 80 is set such that the uppermost original MS is conveyed to a feeder inlet 48.

The original, sent by the pickup roller 80 enters the separation/conveying unit B and is sent to the abutting position with the feeding belt 84 as a feeding member. The feeding belt 84 is stretched between a driving roller 82 and a follower roller 83. As the driving roller 82 is rotated along with a forward rotation of the feed motor 102, the feeding belt 84 is moved clockwise in FIG. 5.

The lower tension surface of the feeding belt 84 abuts on the reverse roller 85 which is a separation member rotated clockwise in the drawing as the feed motor 102 is rotated forward and serves as a repetitive feeding restriction roller. In the separation nip which is the abutting portion, the surface of the feeding belt 84 is moved in the feeding direction. On the contrary, the surface of the reverse roller 85 is to be moved reversely to the feeding direction. However, a torque limiter (not illustrated) is provided in the drive transmission unit of the reverse roller 85. Therefore, if a force directed to the feeding direction is larger than the torque set in the torque limiter, the reverse roller 85 is rotated along the surface in the feeding direction.

In a state that the reverse roller 85 abuts on the feeding belt 84 with a predetermined pressure, and it directly abuts on the feeding belt 84, or it abuts on the feeding belt 84 by interposing a single original MS (only a single original MS is inserted into the separation nip), the reverse roller 85 is rotated counterclockwise in FIG. 5 in synchronization with the feeding belt 84 or the original MS. However, when a plurality of originals MS are inserted into the separation nip, the synchronous rotational force is set to be lower than the torque of the torque limiter. Therefore, the reverse roller 85 is rotated clockwise in the drawing reversely to the synchronous rotation direction. As a result, a driving force of a direction reverse to the feeding direction is applied to the originals MS excluding the uppermost sheet from the reverse roller 85, and only the uppermost original MS is separated from several originals so as to prevent repetitive feeding.

The single original MS separated by the feeding belt 84 and the reverse roller 85 enters the registration unit C. In addition, the original MS is further sent by the feeding belt 84, and the leading edge thereof is detected by an abutting sensor 72. Furthermore, the original MS bumps into a pull-out roller pair 86 which is halted. In this case, the feed motor 102 in the operation is driven for a predetermined time from the detection of the leading edge in the abutting sensor 72 and then, stops. As a result, the original MS is conveyed from the detection position of the abutting sensor 72 only by a predetermined distance. Consequently, the conveyance of the original MS by the feeding belt 84 stops while the original MS is pressed by the pull-out roller pair 86 with a predetermined bending force.

When the leading edge of the original MS is detected by the abutting sensor 72, the pickup roller 80 is retreated from the upper surface of the original MS by rotating the pickup elevator motor 101, and the original MS is conveyed only by a conveying force of the feeding belt 84. As a result, the leading edge of the original MS enters the nip formed by upper and lower rollers of the pull-out roller pair 86, and the leading edge is aligned (as skew correction).

In addition to the skew correction function described above, the pull-out roller pair 86 serves as a roller pair for conveying the separated original MS subjected to the skew correction to an intermediate roller pair 66, one of a pair of the rollers is rotated by driving the pull-out motor 113. Alternatively, the leading edge of the original MS conveyed to the pull-out roller pair 86 by the feeding belt 84 by rotating the feeding belt 84 and the pull-out roller pair 86 may bump into the pull-out roller pair 86, and the original MS may be conveyed by the pull-out roller pair 86 without skew correction.

The feed motor 102 may be used as a driving source of the pull-out roller pair 86. In this case, when the feed motor 102 is rotated forward, the driving force is transmitted to the pickup roller 80, the feeding belt 84, and the reverse roller 85. When the feed motor 102 is rotated backward, the driving force is transmitted to the pull-out roller pair 86. However, if the pull-out roller pair 86 is driven by the pull-out motor 113 which is an independent driving source according to the present embodiment, it is possible to reduce a motor start time and a motor stop time and improve productivity.

The original MS discharged from the pull-out, roller pair 86 passes immediately under an original width sensor 73. The original width sensor 73 includes a plurality of sheet detection sensors such as a reflective photosensor arranged in the original width direction (a direction perpendicular to the plane of FIG. 5) and detects the size of the original MS in the width direction based on which sheet detection sensor detects the original MS. The length of the original MS in the conveying direction is detected based on the motor pulses counted until the original MS is not further detected by the abutting sensor 72 after the leading edge of the original MS is detected by the abutting sensor 72.

The original MS conveyed by rotating the pull-out roller pair 86 and the intermediate roller pair 66 enters the turn-over unit D where the original MS is conveyed by the intermediate roller pair 66 and the reading entrance roller pair 90.

In the intermediate roller pair 66, a driving force is transmitted from both the pull-out motor 113 as a driving source of the pull-out roller pair 86 and the reading entrance motor 114 as a driving source of the reading entrance roller pair 90. In addition, the intermediate roller pair 66 includes a mechanism for determining a rotation velocity based on the driving of the motor having a higher velocity out of both motors.

In the ADF 51, when the original MS is conveyed from the registration unit C to the turn-over unit D by rotating the pull-out roller pair 86 and the intermediate roller pair 66, the conveying velocity in the registration unit C is set to be higher than the conveying velocity of the first reading/conveying unit E. Therefore, it is possible to reduce the time taken to send the original MS to the first reading/conveying unit E. In this case, the intermediate roller pair 66 is rotated by using the pull-out motor 113 as a driving source.

As the leading edge of the original MS is detected by a reading entrance sensor 67, deceleration of the pull-out motor 113 is initiated to make the conveying velocity of the original MS be equal to the conveying velocity of the first reading/conveying unit E before the leading edge of the original MS enters the nip formed by the reading entrance roller pair 90. At the same time, the reading entrance motor 114 and the reading motor 103 are rotated forward. As the reading entrance motor 114 is rotated forward, the reading entrance roller pair 90 is rotated in the conveying direction. As the reading motor 103 is rotated forward, a reading exit roller pair 92 and a second reading exit roller pair 93 are rotated in the conveying direction. If the rotation velocity of the intermediate roller pair 66 caused by the driving and transmission of the reading entrance motor 114 is higher than the rotation velocity of the intermediate roller pair 66 caused by the driving and transmission of the pull-out motor 113 by initiating driving of the reading entrance roller pair 90 and decelerating the pull-out motor 113, the intermediate roller pair 66 is rotated by using the reading entrance motor 114 as a driving source.

As the leading edge of the original MS directed from the turn-over unit D to the first reading/conveying unit E is detected by a registration sensor 65, the controller 100 performs control such that the conveying velocity of the original MS is decelerated over a predetermined feeding distance by decelerating the driving of each motor for a predetermined time. In addition, the controller 100 performs control such that the original MS stops in front of a first reading position 400 of the first fixed reading unit 151, and a registration stop signal is transmitted to the main body control unit 111 through the I/F 107.

Subsequently, as the controller 100 receives the reading start signal from the main body control unit 111, the driving of the reading entrance motor 114 and the reading motor 103 are controlled such that the conveying velocity of the original MS increases up to a predetermined conveying velocity before the leading edge of the original MS which has stopped for registration reaches the first reading position 400. As a result, as the conveying velocity of the original MS increases, the original MS is conveyed to the first reading position 400. In addition, at the timing when the leading edge of the original MS reaches the first reading position 400, computed based on the pulse count of the reading entrance motor 114, a gate signal indicating an effective image area of the first surface of the original MS in the sub-reading direction is transmitted from the controller 100 to the main body control unit 111. This transmission is continued until the trailing edge of the original MS exits from the first reading position 400, and the first surface of the original MS is read by the first fixed reading unit 151.

The original MS having passed through the first reading/conveying unit E passes through the nip of the reading exit roller pair 92. Then, the leading edge thereof is detected by a discharge sensor 61. Then, the original MS passes through the second reading/conveying unit F and is conveyed to the discharge unit G.

In a case where a single side (first surface) of the original MS is read, it is not necessary to read the second surface of the original MS using the second fixed reading unit 95. In this regard, as the leading edge of the original is detected by the discharge sensor 61, the discharge motor 104 starts to rotate forward, and the discharge roller located in the upper side of a pair of ejecting rollers 94 is rotated counterclockwise in the drawing. In addition, the timing when the trailing edge of the original MS exits from the nip of the pair of ejecting rollers 94 is computed based on the pulse count of the discharge motor 104 after the leading edge of the original MS is detected by the discharge sensor 61. Based on the result of this computation, control is made such that the driving velocity of the discharge motor 104 is decelerated at the timing immediately before the trailing edge of the original MS exits from the nip of the pair of ejecting rollers 94, and the original MS is discharged at a velocity sufficient to prevent the original MS from being pop out from the original stack tray 55.

Meanwhile, in a case where both surfaces (including first and second surfaces) of the original MS are read, the timing until the leading edge of the original MS reaches the second fixed reading unit 95 aster it is detected by the discharge sensor 61 is computed based on the pulse count of the reading motor 103. In addition, a gate signal indicating an effective image area on the second surface of the original MS in the sub-reading direction is transmitted to the main body control unit 111 from the controller 100. This transmission is continued until the trailing edge of the original MS exits from the second reading position of the second fixed reading unit 95, and the second surface of the original MS is read by the second fixed reading unit 95.

The second fixed reading unit 95 as a reading unit includes a contact image sensor (CIS), and the reading surface thereof is coated in order to prevent a vertical stripe caused when a pastiness foreign object attached to the original MS is attached to the reading surface.

Next, advantages of the present embodiment will be described.

Figure 8:
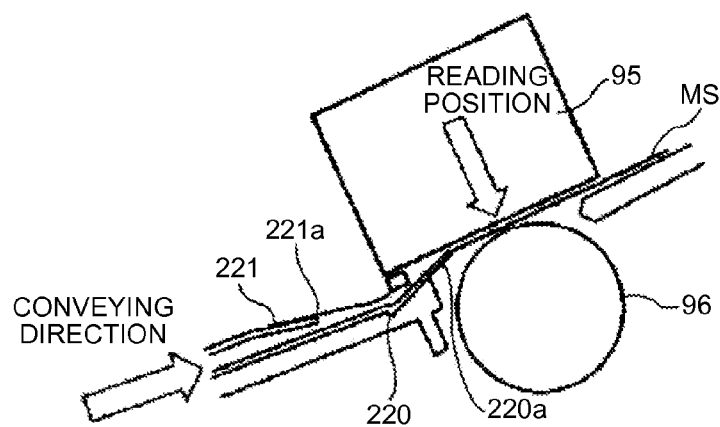
FIG. 8 is an enlarged configuration diagram illustrating surroundings of the second fixed reading unit of the related art.

FIG. 8 is an enlarged configuration diagram illustrating surroundings of the second fixed reading unit 95 of the related art.

As illustrated in FIG. 8, in a configuration of the related art, a second reading roller 96 as an original support unit for supporting the original MS from a non-reading surface side (first surface side) is arranged to face the second fixed reading unit 95 by interposing the original conveying path for feeding the original MS. In addition, a pair of guide members provided between the second fixed reading unit 95 and the reading exit roller pair 92 in order to cause the original to abut on the reading surface of the second fixed reading unit 95 and remove foreign objects attached to the reading surface of the second fixed reading unit 95 are configured as follows. Specifically, a downstream portion 221a of an upper guide member 221 in the original feeding direction in the second fixed reading unit 95 side with respect to the original conveying path is bent to lower guide member 220 side facing an upper guide member 221. In addition, a downstream portion 220a of the lower guide member 220 in the original feeding direction from a bent portion (221a) of the upper guide member 221 is bent to the second fixed reading unit 95 side.

Figure 9:
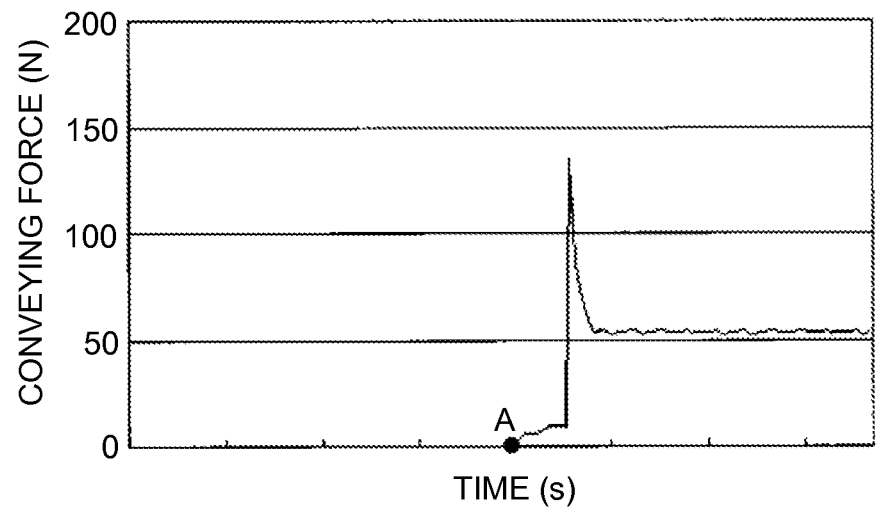
FIG. 9 is a graph illustrating a conveying torque of a reading exit roller pair of the related art when A4 sheets having a weight of 180 kg/1000-sheets are conveyed.
Figure 10:
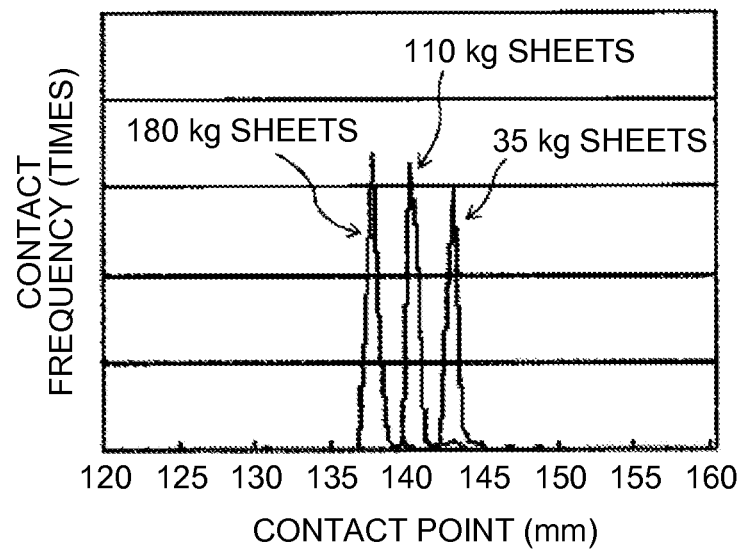
FIG. 10 is a diagram illustrating original contact frequencies in each position of the second fixed reading unit when an original having a different sheet thickness is conveyed in the related art.

FIG. 9 is a graph illustrating the conveying torque of the reading exit roller pair 92 of FIG. 8 in a configuration of the related art when a bundle of the original A4 sheets having a weight of 180 kg/1000-sheets is conveyed. FIG. 10 is a diagram illustrating the original contact frequency in each position of the second fixed reading unit 95 when the originals MS having different thicknesses are conveyed in a configuration of the related art.

Referring to FIG. 9, in a configuration of the related art, it is recognized that the conveying torque abruptly increases soon after the feeding of original MS is initiated (point A in FIG. 9) by the reading exit roller pair 92. It is conceivable that the conveying torque abruptly increases because the leading edge of the original MS bumps into a bent portion 221a of the upper guide member 221 and is forcibly bent to the lower guide member 220 side.

In addition, referring to FIG. 10, it is recognized that a position where the original MS makes contact with the second fixed reading unit 95 is different depending on the thickness of the original MS. Since the reading surface of the second fixed reading unit 95 is set to ±2 mm relative to the reading position, the original MS having a a weight of 180 kg/1000-sheets or a weight of 35 kg/1000-sheets rarely makes contact with the reading surface, for example, even when the most frequently contact position in the original having a weight of 110 kg/1000-sheets is set to the reading position. Therefore, it is not possible to anticipate a cleaning effect of the reading surface if the original is too thick or thin. Similarly, it is conceivable that, since the original MS is forcibly bent by the upper guide member 221 and the lower guide member 220 in a configuration of the related art, the contact position of the second fixed reading unit 95 is deviated by the stiffness of the original MS.

Figure 11:
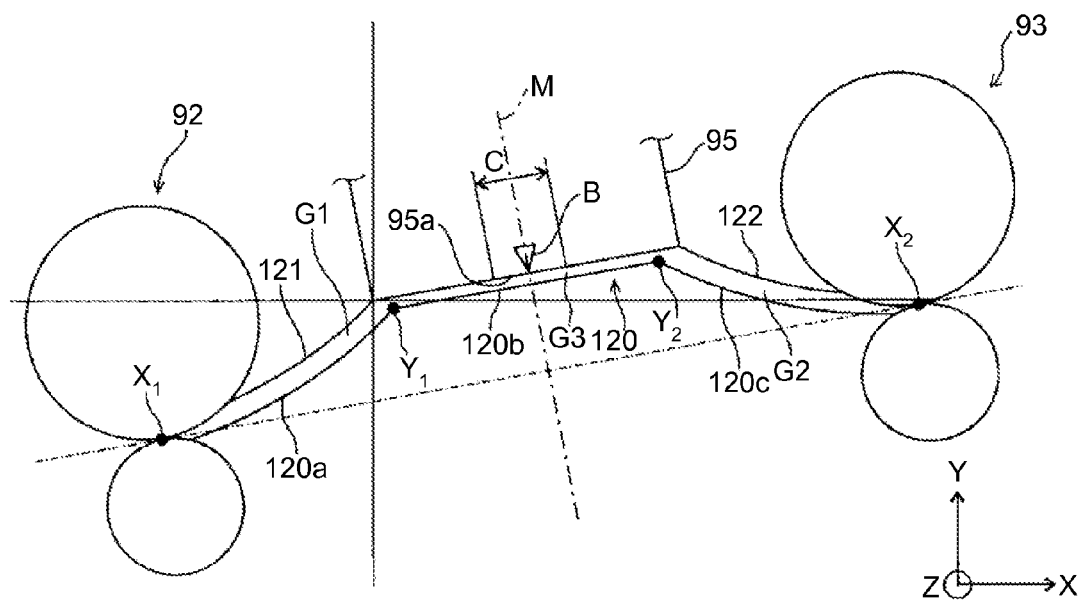
FIG. 11 is a schematic configuration diagram illustrating surroundings of the second fixed reading unit in the ADF according to an embodiment of the invention.

FIG. 11 is a schematic configuration diagram illustrating surroundings of the second fixed reading unit 95 according to the present embodiment.

Referring to FIG. 11, according to present embodiment, a lower guide member 120 faces the second fixed reading unit 95 by interposing the original conveying path. Specifically, the lower guide member 120 includes an opposite guide unit 120b facing the second fixed reading unit 95 by interposing the original conveying path, an upstream-side lower guide unit 120a arranged in the upstream side in the original feeding direction from the opposite guide unit 120b to guide the original from the reading exit roller pair 92 to the second fixed reading unit 95, and a downstream-side lower guide unit 120c arranged in the downstream side of the original conveying direction from the opposite guide unit 120b to guide the original from the second fixed reading unit 95 to the second reading exit roller pair 93. In addition, an upstream-side upper guide member 121 is provided to face the upstream-side lower guide unit 120a by interposing the original conveying path, and a downstream-side upper guide member 122 is provided to face the downstream-side lower guide unit 120c by interposing the original conveying path.

As illustrated in FIG. 11, according to the present embodiment, the original conveying position $X_1$ (nip of the reading exit roller pair) of the reading exit roller pair 92 is provided in a lower side from the reading position B. In addition, the original conveying path from the reading position B no the original conveying position $X_2$ of the second reading exit roller pair 93 is axially symmetric to the original conveying path from the original conveying position $X_1$ of the reading exit roller pair 92 to the reading position with respect to the line M extending perpendicularly to a reading surface 95a of the second fixed reading unit 95. In addition, the original conveying velocity of the second reading exit roller pair 93 is equal to the original conveying velocity of the reading exit roller pair 92. Furthermore, the reading surface 95a of the second fixed reading unit 95 has a range C in the drawing, and is set to ±2 mm with respect to the reading position B.

According to the present embodiment, the original MS entering the original conveying position $X_1$ which is a nip of the reading exit roller pair 92 is guided by the upstream-side upper guide member 121 and the upstream-side lower guide unit 120a of the lower guide member 120 and moves to the reading position B. In this case, since the original conveying position $X_1$, of the reading exit roller pair 92 is located in a lower side with respect to the reading position B in the drawing, the original conveyed to the intersection $Y_1$ between the upstream-side lower guide unit 120a of the lower guide member and the opposite guide unit facing the second fixed reading unit 95 is conveyed to the reading surface 95a of the second fixed reading unit 95. As a result, it is possible to cause the original to make contact with the reading surface 95a (the range C in the drawing), attach the foreign object attached to the reading surface 95a to the original, and clean foreign object attached to the reading surface 95a. Unlike the configuration of the related art illustrated in FIG. 8, it is possible to convey the original to the reading surface 95a of the second fixed reading unit 95 without forcibly bending the original downward using the upper guide member. As a result, it is possible to reduce a torque necessary to convey the original and reduce the size of the driving motor for driving the reading exit roller pair 92. In addition, since the original is not forcibly bent downward, it is possible to suppress a variation of the abutting position caused by the stiffness of the original.

The original conveying path from the reading position B to the original conveying position $X_2$ of the second reading exit roller pair 93 is axially symmetric to the original conveying path from the original conveying position $X_1$ of the reading exit roller pair 92 to the reading position with respect to the line M, and the original conveying position $X_2$ of the second reading exit roller pair 93 is located in a lower side from the reading position in the drawing. Therefore, if the leading edge of the original MS exceeds the intersection $Y_2$ between the opposite guide unit 120b of the lower guide member 120 and the downstream-side lower guide unit 120c, the original is conveyed while the original is bent in a convex shape in the drawing due to the stiffness of itself. Therefore, it is possible to cause the original MS to make contact with the reading surface 95a of the second fixed reading unit 95 due to the stiffness of the original after the leading edge of the original exceeds the intersection $Y_2$ of the downstream-side lower guide unit 120c. In addition, according to the present embodiment, the original conveying path in the upstream side of the original conveying direction from the reading position. B is axially symmetric to the downstream-side original conveying path with respect to the line M. Therefore, it is possible to stabilize a behavior of the original MS when the original is conveyed across the upstream-side original conveying path G1 and the downstream-side original conveying path G2. As a result, it is possible to cause the original MS to stably make contact with the reading surface 95a and appropriately clean a foreign object attached to the reading surface 95a. In addition, it is possible to bend the original in a convex shape in the drawing without delaying the conveying velocity of the second reading exit roller pair 93 relative to the conveying velocity of the reading exit roller pair 92. As a result, it is possible to suppress reduction of the conveying velocity of the original MS and improve productivity.

According to the embodiment, the upstream-side original conveying path G1 including the upstream-side upper guide member 121 and the upstream-side lower guide unit 120a has a concave state in the drawing. As a result, it is possible to reliably convey the original MS conveyed to the intersection $Y_1$ between the upstream-side lower guide unit 120a and the opposite guide unit 120b toward the reading surface 95a of the second fixed reading unit 95. In addition, it is possible to cause the original MS to make reliable contact with the reading surface 95a of the second fixed reading unit 95.

Next, a verification experiment performed by the inventors will be described.

Figure 12:
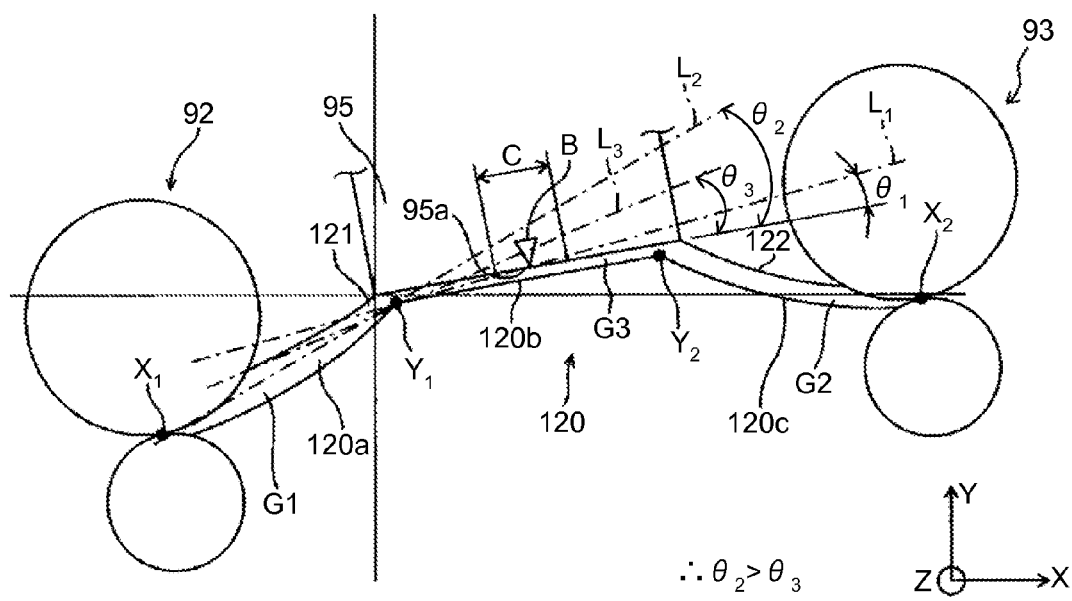
FIG. 12 is a schematic configuration diagram illustrating an exemplary condition in which an original can make contact with a reading surface even when the thickness of the original is different.

If the thickness of the original is different, the stiffness thereof is also different. Therefore, a behavior of the original MS conveyed from the original conveying position $X_1$ of the reading exit roller pair 92 to the original conveying position $X_2$ of the second reading exit roller pair 92 may be different. If the behavior of the original MS is different depending on the thickness of the original MS, the original may not make contact with the reading surface 95a (range C in the drawing) depending on the thickness of the original MS, so that a sufficient cleaning capability may not be obtained. In this regard, the inventors have made diligent studies on the condition for allowing the original MS to make contact with the reading surface 95a even when the thickness of the original MS is different. As a result, it was conceived that, as illustrated in FIG. 12, an angle $\theta_1$ between the reading surface 95a of the second fixed reading unit 95 and the line $L_1$ obtained by connecting the intersection $Y_1$ between the upstream-side lower guide unit 120a and the opposite guide unit 120b and the reading position B serves as an important factor for causing the original MS to make contact with the reading surface 95a. If the angle $\theta_1$ is reduced, the contact position between the original MS and the second fixed reading unit 95 is deviated toward upstream side of the original conveying direction, and the original MS does not make contact with the reading surface 95a. In contrast, if the angle $\theta_1$ is raised, the clearance between the opposite guide unit 120b and the second fixed reading unit 95 increases so that the bent original does not make contact with the second fixed reading unit 95. Therefore, if the angle $\theta_1$ is set to an optimal value, it is possible to cause the original MS to make contact with the reading surface 95a.

In addition, as illustrated in FIG. 12, if an angle $\theta_2$ between the reading surface 95a of the second fixed reading unit 95 and the line $L_2$ obtained by connecting the intersection $Y_1$ between the upstream-side lower guide unit 120a and the opposite guide unit 120b and the original conveying position $X_1$ of the reading exit roller pair 92 is greater than an angle $\theta_3$ between the reading surface 95a of the second fixed reading unit 95 and the tangential line passing through the intersection $Y_1$ between the upstream-side lower guide unit 120a and the opposite guide unit 120b out of the tangential lines of the upstream-side upper guide member 121 (if $\theta_2 > \theta_3$), the original MS is conveyed without contact with the upstream-side upper guide member 121. That is, in this case, the original conveying position $X_1$ (nip of the reading exit roller pair 92) serves as an important factor for determining a posture of the conveyed original MS within the upstream-side original conveying path G1. The conveying torque of the reading exit roller pair 92 during the original feeding or the contact position between the original MS and the second fixed reading unit 95 is changed depending on the posture of the conveyed original MS within the upstream-side original conveying path G1. For this reason, the angle $\theta_2$ is also an important condition for bringing the original MS into contact with the reading surface 95a.

Figure 13:
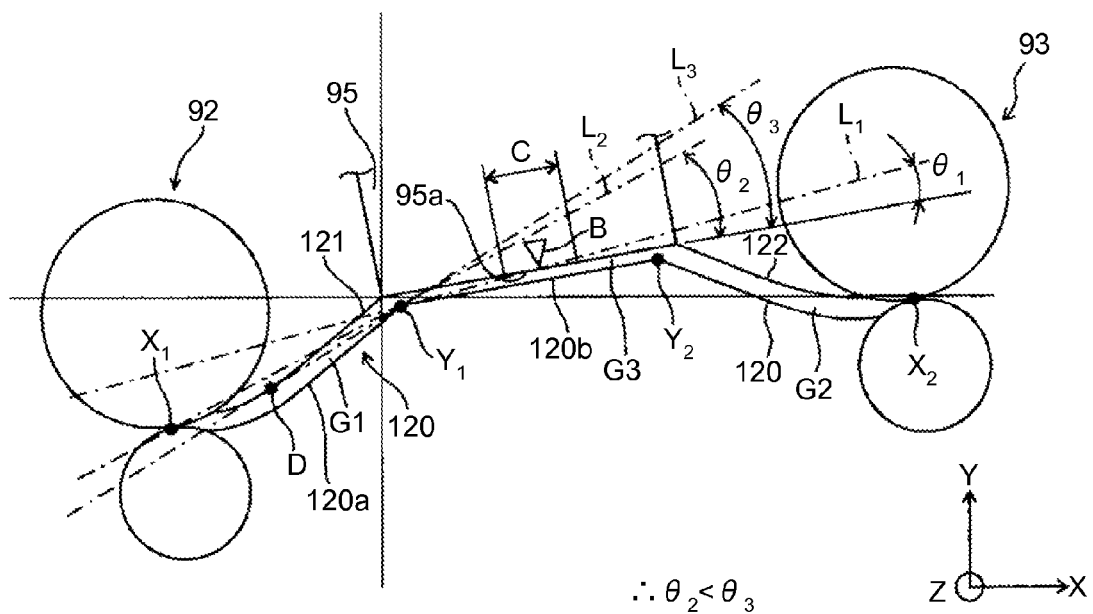
FIG. 13 is a schematic configuration diagram illustrating another exemplary condition in which an original can make contact with a reading surface even when the thickness of the original is different.

Meanwhile, as illustrated in FIG. 13, if $\theta_2 < \theta_3$, the original MS makes contact with a contact point ID between the tangential line $L_3$ and the upstream-side upper guide member 121, and the upstream-side upper guide member 121 serves as an important factor for determining the posture of the original MS conveyed within the upstream-side original conveying path G1. Therefore, if $\theta_2 < \theta_3$, the angle $\theta_3$ serves as an important factor for causing the original MS to make contact with the reading surface 95a.

Figure 14:
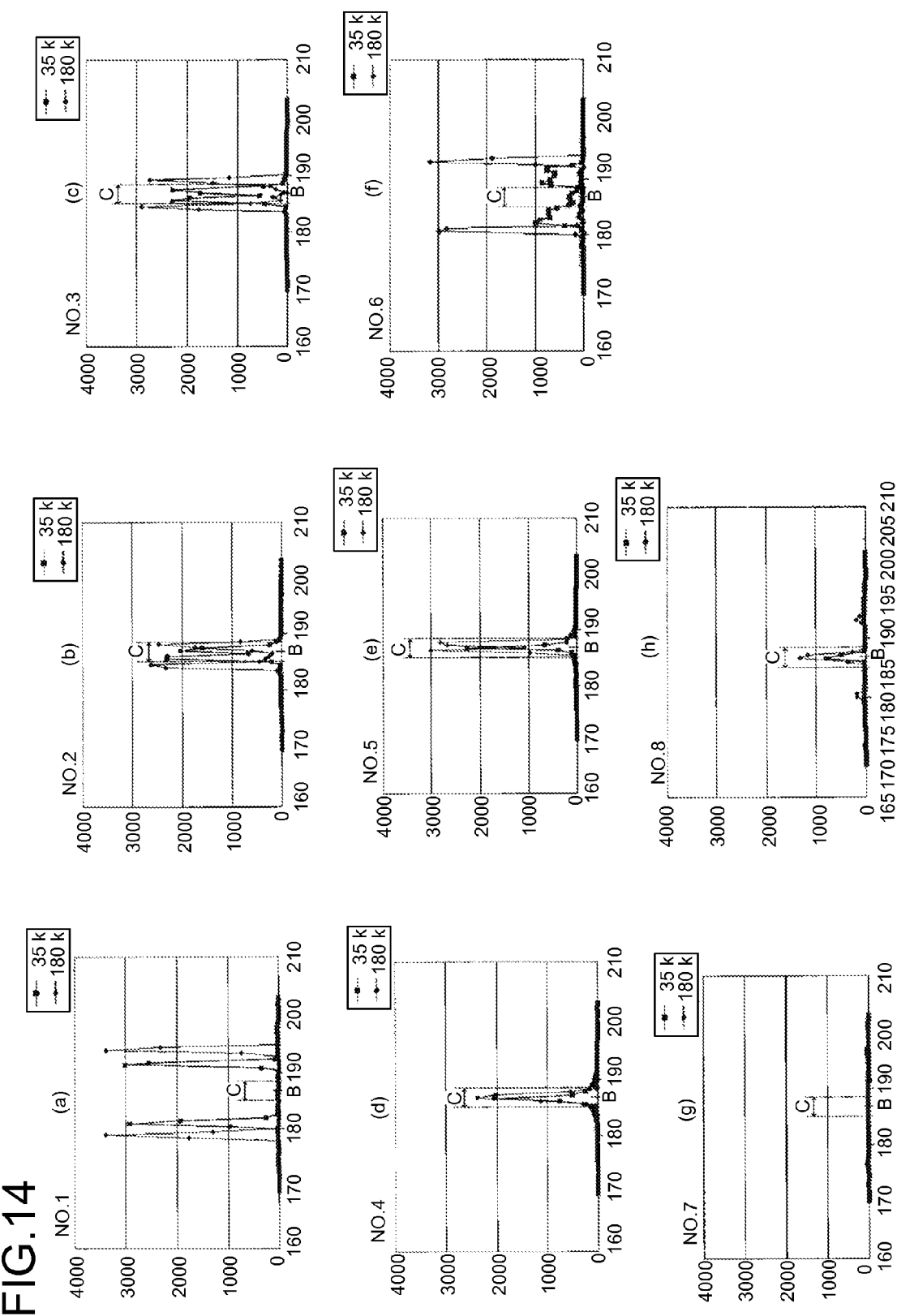
FIG. 14 illustrates graphs plotted by measuring contact frequencies between the original and the second fixed reading unit in each position in an original conveying direction for each guide configuration.

The following Table 1 shows a result of investigation regarding the original conveying force and the cleaning capability (contact frequency on the reading surface 95a (range C in the drawing) by using different guide structures for the angles $\theta_1$ and $\theta_2$ (or $\theta_3$). FIG. 14 illustrate graphs (a) to (h) obtained by investigating the contact frequency between the original and the second fixed reading unit 95 in each position of the original conveying direction in each guide structure. In (a) to (h) of FIG. 14, the reference symbol B denotes a reading position, and the reference symbol C denotes a reading surface 95a of the second fixed reading unit 95. The original conveying force is a result of simulation analysis for obtaining a necessary conveying force based on a shape of the guide plate and the like. In addition, the contact position was measured for a position of the center of the contact portion in the original feeding direction between the original and the second fixed reading unit 95 through a simulation analysis for every 0.2 second. Since the time taken for the original to exit from the reading surface C is about 0.4 second, the cleaning capability is determined to be good if the contact frequency of the original MS in the reading surface 95a is equal to or greater than 400. Otherwise, if the contact frequency is smaller than 400, the cleaning capability is determined to be bad. In addition, as the verification condition, it was assumed that an A4 sheet is conveyed, and the original conveying velocity was set to 595 m/s. In addition, the original feeding length from the original conveying position $X_1$ of the reading exit roller pair 92 to the original conveying position $X_2$ of the second reading exit roller pair was set to 76 mm.

TABLE 1

| No. | | 1 | 2 | 3 | 4 | 5 | 6 | 7 | 8 |
|---|---|---|---|---|---|---|---|---|---|
| $\theta_1$ | | 2.9 | 5.1 | 5.1 | 6.1 | 4.1 | 2.9 | 7.1 | 5.1 |
| $\theta_2$ (or $\theta_3$) | | 21.7 | 19.5 | 22.6 | 18.6 | 13.5 | 11.7 | 7.8 | 13.2 |
| Conveying force of thick sheet | | 47.9 | 47.9 | 47.8 | 26.1 | 16.9 | 45.8 | 7.8 | 15.4 |
| Cleaning capability | 35k | BAD | GOOD | GOOD | GOOD | GOOD | BAD | BAD | GOOD |
| | 180k | BAD | GOOD | GOOD | GOOD | GOOD | BAD | BAD | GOOD |

Referring to Table 1, when the angle $\theta_1$ is in a range from 4.1° to 6.1°, the contact frequency at the reading surface 95a for both the thin sheets having a weight of 35 kg/1000-sheets and the thick sheets having a weight of 180 kg/1000-sheets is 400 or higher. In any case, it is possible to obtain an excellent cleaning capability. In contrast, in the guide structures Nos. 1 and 6 having an angle $\theta_1$ of 2.9°, as illustrated in (a) and (f) of FIG. 14, a graph has two peaks at a position deviated from the reading surface 95a (range C in the drawing). It is conceivable that the graphs of (a) to (h) of FIG. 14 are obtained because the original MS is conveyed with ripples in the read original conveying path G3 (refer to FIG. 11) including the second fixed reading unit 95 and the opposite guide unit 120b. In addition, in the guide structure No. 7 having an angle $\theta_1$ of 7.1°, the original rarely makes contact with the second fixed reading unit 95 as illustrated in (g) of FIG. 14. It is conceivable that this result is obtained because the angle $\theta_1$ increases significantly, and the clearance between the second fixed reading unit 95 and the opposite guide unit 120b increases, so that original MS does not make contact with the second fixed reading unit 95 even when it is bent. Accordingly, it is possible to obtain an excellent cleaning capability by setting the angle $\theta_1$ to a range from 4.1° to 6.1°.

Comparing the experiment results for the guide structures Nos. 2, 3, and 8 having the same angle of $\theta_1$, the contact position is deviated in the guide structures Nos. 2 and 3 having a large angle of $\theta_2$ (or $\theta_3$) as illustrated in (b) and (c) of FIG. 14. However, in the guide structure No. 8, as illustrated in (h) of FIG. 14, it is recognized that the original makes contact in the reading position B when the original is either the thin sheet or the thick sheet. As shown in Table 1, the conveying force is lower in the guide structure No. 8 in comparison with the guide structure No. 2 or 3.

Figure 15A:
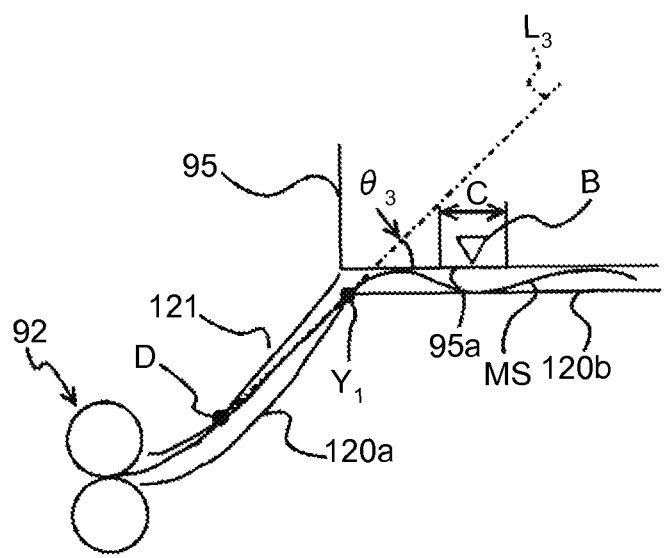
FIG. 15A is a schematic diagram illustrating a behavior of the original when an angle $\theta_2$ or $\theta_3$ is large.
Figure 15B:
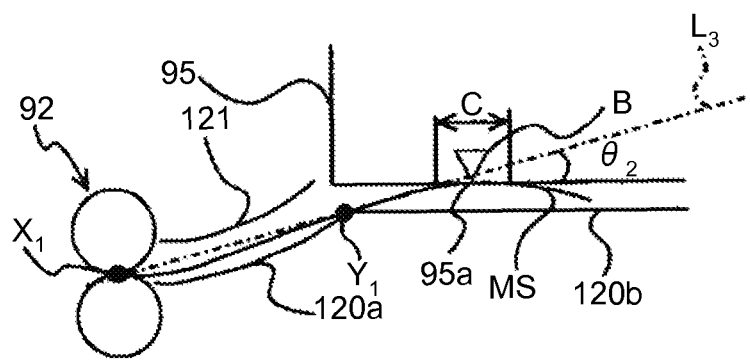
FIG. 15B is a schematic diagram illustrating a behavior of the original when an angle $\theta_2$ or $\theta_3$ is within a proper range.

In the guide structure No. 2 or 3 having a large angle of $\theta_2$ (or $\theta_3$), the angle from the intersection $Y_1$ to the second fixed reading unit 95 increases as illustrated in FIG. 15A in comparison with the case where the angle $\theta_2$ (or $\theta_3$) is small as illustrated in FIG. 15B. As a result, it is conceivable that the leading edge of the original MS bumps into the second fixed reading unit 95, and the original MS is conveyed while the leading edge thereof is forcibly bent by the second fixed reading unit 95, so that a conveying force is strong, and it is easy to generate a ripple. Meanwhile, in the guide structure No. 8, it is conceivable that the angle from the intersection $Y_1$ to the second fixed reading unit 95 is small, and the original is bent while it is smoothly guided to the second fixed reading unit 95, so that a conveying force is reduced, and ad is difficult to generate a ripple. In addition, ad is possible to convey the original MS without applying an excessive load by the guide mechanism and suppress an effect from the stiffness of the original. Therefore, it is conceivable that the contact position is set in nearly the same position in both thick and thin sheets.

In addition, it is necessary to set the angle $\theta_1$ to be smaller than the angle $\theta_2$ or $\theta_3$. This is because, if the angle $\theta_1$ is greater Lhdn the angle $\theta_2$, the reading position B is moved upward from the position of FIG. 15B, so that the original MS may not make contact with the reading surface 95a.

Figure 16:
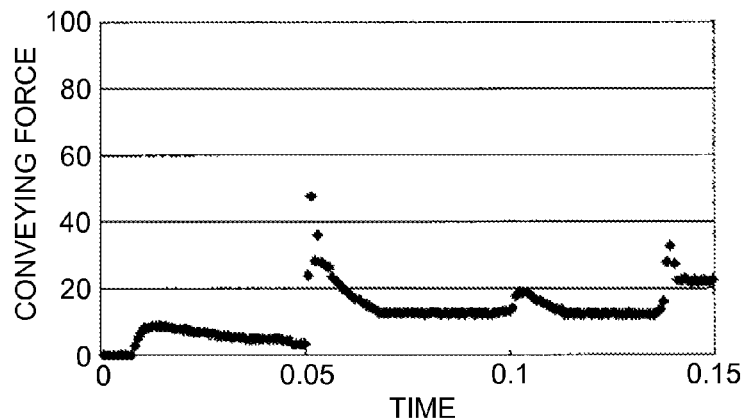
FIG. 16 is a graph illustrating a temporal change of the original conveying force in a guide structure No. 1.
Figure 17:
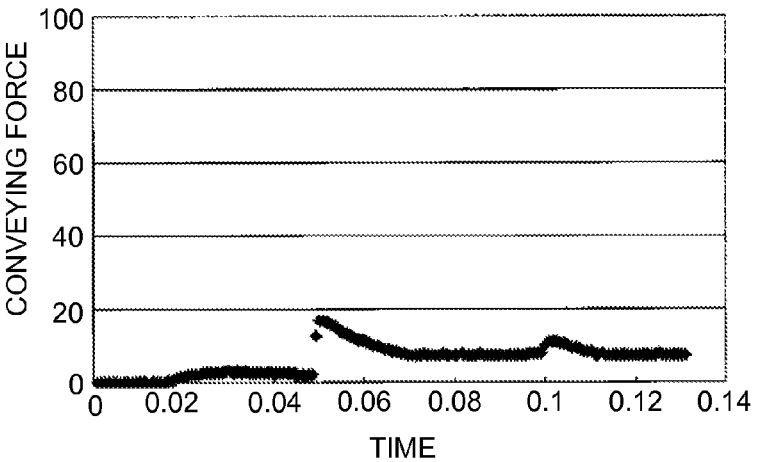
FIG. 17 is a graph illustrating a temporal change of the original conveying force in a guide structure No. 5.
Figure 18:
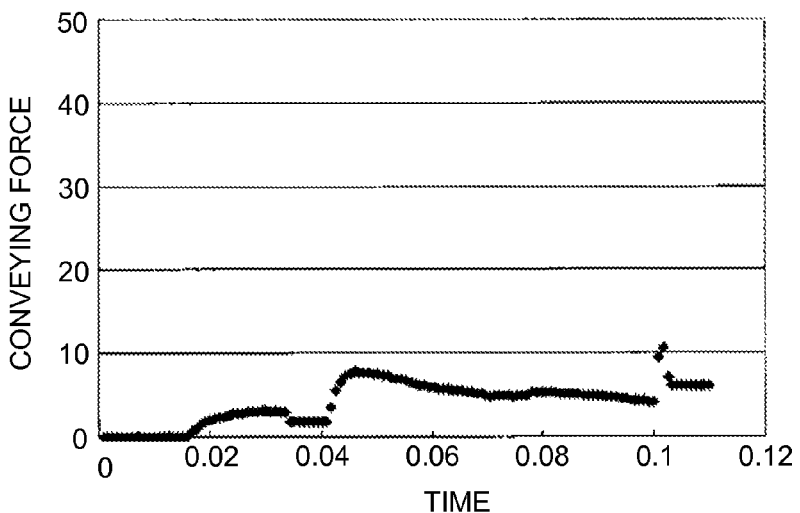
FIG. 18 is a graph illustrating a temporal change of the original conveying force in a guide structure No. 7.

FIG. 16 is a graph illustrating a temporal change of the original conveying force in the guide structure No. 1, FIG. 17 is a graph illustrating a temporal change of the original conveying force in the guide structure No. 5. FIG. 18 is a graph illustrating a temporal change of the original conveying force in the guide structure No. 7. In the guide mechanism No. 1, since the angle $\theta_2$ (or $\theta_3$) is greater, the angle when the leading edge of the original MS bumps into the second fixed reading unit 95 is significant as illustrated in FIG. 16. Therefore, the conveying force abruptly increases soon after the original conveying is initiated by the reading exit roller pair 92. Meanwhile, as illustrated in FIG. 17, in the guide mechanism No. 5, it is recognized that, since the angle $\theta_2$ (or $\theta_3$) is smaller, the original is conveyed while the original smoothly makes contact with the second fixed reading unit 95 without abruptly increasing the conveying force. Comparing FIGS. 17 and 18, it is recognized that, by reducing the angle $\theta_2$ (or $\theta_3$), it is possible to obtain nearly the same change as that of the case where the original MS does not match with the second fixed reading unit 95. That is, it is conceivable that, using the guide structure No. 5, it is possible to convey the original without applying an excessive load on the original while the original makes contact with the reading surface 95a.

As recognized from Table 1, it is possible to suppress the original conveying force by setting the angle $\theta_2$ (or $\theta_3$) to a range from 13.2° to 18.6°. As a result, it is possible to appropriately convey the original using the reading exit roller pair 92 without using a large-scaled motor capable of producing a high torque as a driving motor for rotating the reading exit roller pair 92. As a result, it is possible to suppress the size of apparatus from increasing.

Although the lower guide member 120 faces the second fixed reading unit 95 according to the present embodiment, the second reading roller 96 may face the reading surface 95a of the second fixed reading unit 95 as illustrated in FIG. 8 similar to the related art.

Although the upstream-side original conveying path G1 is bent to the side opposite to the second fixed reading unit 95 (to the lower guide member side) in the description above, the upstream-side original conveying path G1 may be formed in a straight line shape. Even when the upstream-side original conveying path G1 is formed in the straight line shape, it is possible to match the original MS with the reading surface 95a of the second fixed reading unit 95.

As described above, the ADF 51 as an image reading device according to the present embodiment includes: the reading exit roller pair 92 as a conveying unit for conveying the original MS; the second fixed reading unit 95 as a reading unit for reading an image of the original MS conveyed by the reading exit roller pair 92; and the guide unit (upstream-side upper guide member 121 and lower guide member 120) arranged between the reading exit roller pair 92 and the second fixed reading unit 95 to guide the original MS. The original is guided to an upper direction using the guide unit while the original conveying position $X_1$ of the reading exit roller pair 92 is arranged in a lower side from the reading position B as seen from a direction parallel to the reading surface 95a of the second fixed reading unit 95 and perpendicular to the original conveying direction in the original reading position B of the second fixed reading unit 95. In such a configuration, as described above, the original can be conveyed using the upper guide member to the lower guide member side such that the original makes contact with the reading surface 95a of the second fixed reading unit 95 without forcibly bending the original. Therefore, it is possible to reduce a conveying torque of the reading exit roller pair 92. As a result, it is possible to suppress the size of the motor from increasing and miniaturize the apparatus. In addition, it is possible to reduce a load applied to a mechanism for transmitting a driving force of the driving motor to the reading exit roller pair 92 and improve integrity of the apparatus.

In addition, the upstream-side original conveying path G1 as an original conveying path including the upstream-side upper guide member 121 and the upstream-side lower guide unit 120a of the lower guide member is formed to have a convex shape in the side opposite to the second fixed reading unit 95 with respect to the upstream-side original conveying path G1. As a result, it is possible to convey the original MS conveyed through the upstream-side original conveying path G1 so as to enter the reading surface 95a of the second fixed reading unit 95. In addition, the original conveying path when the original enters the portion facing the second fixed reading unit 95 has a convex shape to the second fixed reading unit 95 side with respect to the original conveying path. As a result, the original making contact with the reading surface of the second fixed reading unit can be smoothly bent to the second fixed reading unit side. Therefore, it is possible to suppress the conveying torque from increasing and cause the original to make appropriate contact with the reading surface 95a.

In addition, even when the upstream-side original conveying path G1 as an original conveying path including the upstream-side upper guide member 121 and the upstream-side lower guide unit 120a of the lower guide member 120 has a straight line shape, it is possible to convey the original MS conveyed through the upstream-side original conveying path G1 so as to enter the reading surface 95a of the second fixed reading unit 95.

The guide unit described above includes the upstream-side upper guide member 121 as a first guide unit arranged in the second fixed reading unit 95 side with respect to the aforementioned original conveying path and the upstream-side lower guide unit 120a as a second guide unit arranged to face the upstream-side upper guide member 121 by interposing the aforementioned original conveying path. As seen from a direction parallel to the reading surface of the second fixed reading unit 95 and perpendicular to an original conveying direction in the original reading position B of the second fixed reading unit 95, the upstream-side upper guide member 121 is located in the second fixed reading unit 95 side from a line obtained by connecting a downstream end (intersection with the opposite guide unit 120b) of the upstream-side lower guide unit 120a in an original conveying direction and the original conveying position $X_1$ with respect to the original conveying path, and a relation $\theta_1 < \theta_2$ is established, where $\theta_1$ denotes an angle between the reading surface 95a and a line $L_1$ obtained by connecting the original reading position B and a downstream end $Y_1$ of the upstream-side lower guide unit 120a in the original conveying direction and, $\theta_2$ denotes an angle between the reading surface 95a and a line obtained by connecting a downstream end $Y_1$ of the upstream-side lower guide unit 120a in the original conveying direction and the original conveying position $X_1$. If the angle $\theta_2$ is smaller than the angle $\theta_1$, the original conveying velocity from the downstream end $Y_1$ of the original conveying direction to the reading surface 95a is reduced, so that the original MS may not make contact with the second fixed reading unit 95. If $\theta_1 < \theta_2$, it is possible to cause the original MS to make appropriate contact with the reading surface 95a.

When a part of the upstream-side upper guide member 121 is located in the lower guide member side from the line $L_2$, the angle $\theta_3$ between the reading surface and the tangential line of the first guide unit passing through the downstream end of the second guide unit in the original conveying direction is set to be greater than the angle $\theta_1$ ($\theta_1 < \theta_3$). As a result, it is possible to cause the original MS to make appropriate contact with the reading surface 95a.

If the angle $\theta_1$ is in a range from 4.1° to 6.1°, it is possible to cause the original MS to make appropriate contact with the reading surface 95a even when the thickness of the original is different as indicated in the verification experiment described above. As a result, it is possible to appropriately clean the reading surface 95a.

If the angle $\theta_2$ or $\theta_3$ is in a range from 13.2° to 18.6°, it is possible to reduce a conveying force necessary for the reading exit roller pair 92 to convey the original MS and suppress the size of the motor from increasing as indicated in the verification experiment described above.

In addition, the conveying position $X_2$ of the second reading exit roller pair 93 as a downstream-side conveying unit arranged in the downstream side of the original conveying direction from the reading position B is arranged in a side opposite to the second fixed reading unit 95 with respect to the original conveying path in the reading position B. As a result, it is possible to bend the original to the reading surface side as the leading edge of the original is conveyed from the reading position to the second reading exit roller pair 93. As a result, it is possible to cause the original to make appropriate contact with the reading surface and obtain an excellent cleaning capability of the reading surface 95a.

The original conveying path from the reading position B to the second reading exit roller pair 93 is axially symmetric to the original conveying path from the reading exit roller pair 92 to the reading position B with respect to a direction perpendicular to the original conveying direction in the original reading position. As a result, it is possible to convey the original to the upstream side and the downstream side of the original conveying direction from the reading position B with a similar curvature. As a result, it is possible to cause the original MS to make stable contact with the reading surface 95a.

In addition, the original conveying velocity of the second reading exit roller pair 93 is equal to the original conveying velocity of the aforementioned reading exit roller pair 92. According to the present embodiment, by conveying the original as described above, it is possible to bend the original such that the original conveying velocity of the second reading exit roller pair 93 is not delayed from the original conveying velocity of the reading exit roller pair 92. Therefore, since the original conveying velocity of the second reading exit roller pair 93 can be equal to the original conveying velocity of the aforementioned reading exit roller pair 92, it is possible to improve productivity in comparison with a case where the original conveying velocity of the second reading exit roller pair 93 is delayed from the original conveying velocity of the aforementioned reading exit roller pair 92.

In addition, in the image forming apparatus according to the present embodiment, since the aforementioned ADF 51 is provided, it is possible to appropriately copy an image by suppressing generation of a vertical stripe.

According to the embodiment, in the conveying unit, the original conveying position for applying a conveying force to the original is arranged in the lower side from the reading position in a direction perpendicular to the reading surface of the reading unit. Therefore, by guiding the original passing through the original conveying position to the upper direction using the guide unit, it is possible to convey the original such that the original bumps into the reading surface of the reading unit, and the original can make contact with the reading surface. Therefore, it is possible to convey the original to the upper direction without temporarily conveying the original to the lower direction by making the original bump into the bent portion of the upper guide member of the guide unit to forcibly bend the original. As a result, it is possible to reduce a conveying force necessary to convey the original to the original reading unit. As a result, it is possible to use a small-sized motor and suppress the size of the apparatus from increasing. Since the small-sized motor can be used, it is possible to reduce rigidity for supporting the motor and reduce costs.

In addition, since the original can abut on the reading surface of the reading unit only by guiding the original to the reading unit from the conveying unit in the upper direction, it is possible to suppress the abutting position of the conveyed original to the reading surface from being deviated depending on the thickness (stiffness) of the original. Therefore, it is possible to appropriately remove the dirt attached to the reading range even when the thickness of the original is different.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising:
an upstream-side conveying unit configured to convey an original;
a reading unit configured to read an image of the original conveyed by the upstream-side conveying unit at a reading position of the reading unit, the reading unit having a reading surface facing the original when the image is read; and
a guide unit arranged between the upstream-side conveying unit and the reading unit to guide the original,
wherein an original conveying position at which the upstream-side conveying unit applies a conveying force to the original is arranged than the reading position in a direction perpendicular to the reading surface of the reading unit, and the guide unit is configured such that the original having passed through the original conveying position is guided upward to the reading position, and
the guide unit forms a first original conveying path from the upstream-side conveying unit to the reading unit and a second original conveying path facing the reading unit, the first original conveying path having a straight line shape, the first original conveying path and the second original conveying path forming a path convex toward the reading unit side.

2. The image reading device according to claim 1, wherein the guide unit includes a first guide unit and a second guide unit which form the first original conveying path, the first guide unit being arranged in the reading unit side, the second guide unit being arranged to face the first guide unit across the first original conveying path, the first guide unit is located in the reading unit side from a first line obtained by connecting a downstream end of the second guide unit in an original conveying direction and the original conveying position, and
an angle $\theta_1$ between the reading surface and a second line obtained by connecting the original reading position and the downstream end of the second guide unit is smaller than an angle $\theta_2$ between the reading surface and the first line.

3. The image reading device according to claim 2, wherein the angle $\theta_1$ is in a range from 4.1° to 6.1°.

4. The image reading device according to claim 2, wherein the angle $\theta_2$ is in a range from 13.2° to 18.6°.

5. The image reading device according to claim 1, wherein the guide unit includes a first guide unit and a second guide unit which form the first original conveying path, the first guide unit being arranged in the reading unit side, the second guide unit being arranged to face the first guide unit across the first original conveying path,
a part of the first guide unit protrudes toward a side opposite to the reading unit side from a first line obtained by connecting a downstream end of the second guide unit in an original conveying direction and the original conveying position, and
an angle $\theta_1$ between the reading surface and a second line obtained by connecting the original reading position and the downstream end of the second guide unit is smaller than an angle $\theta_3$ between the reading surface and a tangential line of the first guide unit passing through the downstream end of the second guide unit.

6. The image reading device according to claim 1, further comprising a downstream-side conveying unit arranged in a downstream side of an original conveying direction from the original reading position, wherein
an original conveying position at which the downstream-side conveying unit applies a conveying force to the original is arranged lower than the original reading position in a direction perpendicular to the reading surface.

7. The image reading device according to claim 6, wherein, a third original conveying path from the original reading position to the downstream-side conveying unit is axially symmetric to a first original conveying path from the upstream-side conveying unit to the original reading position with respect to a direction perpendicular to the original conveying direction in the original reading position.

8. The image reading device according to claim 6, wherein a velocity of the original conveyed by the downstream-side conveying unit is equal to a velocity of the original conveyed by the upstream-side conveying unit.

9. An image forming apparatus comprising:
the image reading device according to claim 1; and
an image forming unit configured to form an image based on a result of the reading of the image reading device.

10. An image reading device comprising:
an upstream-side conveying unit configured to convey an original;
a reading unit configured to read an image of the original conveyed by the upstream-side conveying unit at a reading position of the reading unit, the reading unit having a reading surface facing the original when the image is read; and
a guide unit arranged between the upstream-side conveying unit and the reading unit to guide the original,
wherein an original conveying position at which the upstream-side conveying unit applies a conveying force to the original is arranged lower than the reading position in a direction perpendicular to the reading surface of the reading unit, and the guide unit is configured such that the original having passed through the original conveying position is guided upward, and the guide unit forms a first original conveying path from the upstream-side conveying unit to the reading unit and a second original conveying path facing the reading unit, the first original conveying path having a convex shape toward a side opposite to the reading unit side, the first original conveying path and the second original conveying path forming a path convex toward the reading unit side.

11. The image reading device according to claim 10, further comprising a downstream-side conveying unit arranged in a downstream side of an original conveying direction from the original reading position, wherein as seen from the direction parallel to the reading surface of the reading unit and perpendicular to the original conveying direction in the original reading position of the reading unit, the original conveying position is arranged in a lower side from the original reading position in a direction perpendicular to the reading surface.

12. The image reading device according to claim 11, wherein, as seen from the direction parallel to the reading surface of the reading unit and perpendicular to the original conveying direction in the original reading position of the reading unit, a third original conveying path from the original reading position to the downstream-side conveying unit is axially symmetric to a first original conveying path from the upstream-side conveying unit to the original reading position with respect to a direction perpendicular to the original conveying direction in the original reading position.

13. The image reading device according to claim 11, wherein a velocity of the original conveyed by the downstream-side conveying unit is equal to a velocity of the original conveyed by the upstream-side conveying unit.

14. An image forming apparatus comprising:

the image reading device according to claim 10; and an image forming unit configured to form an image based on a result of the reading of the image reading device.

* * * * *